United States Patent
Zhang et al.

(10) Patent No.: US 10,230,661 B2
(45) Date of Patent: Mar. 12, 2019

(54) DISTRIBUTED VIRTUAL NETWORK EMBEDDING

(71) Applicant: Fujitsu Limited, Kawasaki-shi, Kanagawa (JP)

(72) Inventors: Qiong Zhang, Plano, TX (US); Paparao Palacharla, Richardson, TX (US); Tadashi Ikeuchi, Plano, TX (US); Xi Wang, Murphy, TX (US); Inwoong Kim, Allen, TX (US)

(73) Assignee: FUJITSU LIMITED, Kawasaki (JP)

( * ) Notice: Subject to any disclaimer, the term of this patent is extended or adjusted under 35 U.S.C. 154(b) by 211 days.

(21) Appl. No.: 15/424,398

(22) Filed: Feb. 3, 2017

(65) Prior Publication Data
US 2018/0227243 A1    Aug. 9, 2018

(51) Int. Cl.
| | |
|---|---|
| G06F 15/173 | (2006.01) |
| H04L 12/915 | (2013.01) |
| H04L 12/713 | (2013.01) |
| H04L 12/931 | (2013.01) |
| H04L 12/24 | (2006.01) |

(Continued)

(52) U.S. Cl.
CPC .......... *H04L 47/785* (2013.01); *H04L 41/12* (2013.01); *H04L 43/0852* (2013.01); *H04L 43/0876* (2013.01); *H04L 45/586* (2013.01); *H04L 47/827* (2013.01); *H04L 49/70* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 9,979,602 B1* | 5/2018 | Chinnakannan | ........ H04L 41/12 |
| 2016/0057075 A1* | 2/2016 | Parikh | ........... H04L 47/762 |
| | | | 709/226 |

(Continued)

OTHER PUBLICATIONS

Andreev, Konstantin, et al. "Balanced graph partitioning." Proceedings of the sixteenth annual ACM symposium on Parallelism in algorithms and architectures, 2004; 12 pages.

(Continued)

*Primary Examiner* — Phyllis A Book
(74) *Attorney, Agent, or Firm* — Baker Botts L.L.P.

(57) ABSTRACT

Systems and methods for performing distributed virtual network embedding are disclosed. A resource orchestrator may receive a virtual network request specifying a set of virtual nodes, a set of virtual links, each connecting two virtual nodes in a mesh topology, and resource requirements for some virtual nodes. The orchestrator may partition the virtual network request into multiple sub-requests, each specifying a linear topology for a subset of the virtual nodes and links within the mesh topology. The sub-requests may collectively include all virtual links within the mesh topology with no overlapping links. Resource orchestrators may collaborate to compute, independently for each sub-request, a respective chaining solution in which each virtual node is mapped to a physical node having resources sufficient to implementing the virtual node. A resource orchestrator may combine the respective chaining solutions for each of the sub-requests to generate a mapping solution for the virtual network request.

20 Claims, 18 Drawing Sheets

(51) Int. Cl.
H04L 12/911 (2013.01)
H04L 12/26 (2006.01)

(56) References Cited

U.S. PATENT DOCUMENTS

| | | | | |
|---|---|---|---|---|
| 2016/0105332 A1* | 4/2016 | Xiang | H04L 41/5045 | 709/226 |
| 2016/0156513 A1* | 6/2016 | Zhang | H04W 4/70 | 709/220 |
| 2016/0191370 A1* | 6/2016 | Wood | H04L 45/02 | 370/238 |
| 2016/0212017 A1* | 7/2016 | Li | H04L 41/20 | |
| 2017/0302530 A1* | 10/2017 | Wolting | H04L 41/0896 | |
| 2018/0077080 A1* | 3/2018 | Gazier | H04L 47/803 | |
| 2018/0139154 A1* | 5/2018 | Rajagopal | H04L 41/22 | |
| 2018/0212895 A1* | 7/2018 | Szabo | H04L 41/5041 | |

OTHER PUBLICATIONS

Vaishnavi, Ishan, et al. "Recursive, hierarchical embedding of virtual infrastructure in multi-domain substrates." Proceedings of the 1st IEEE Conference on Network Softwarization (NetSoft), London, UK, Apr. 2015; 9 pages.

Houidi, Ines, et al. "Virtual network provisioning across multiple substrate networks." Computer Networks, vol. 55, No. 4, Mar. 2011, pp. 1011-1023; 14 pages.

Xin, Yufeng, et al. "Embedding virtual topologies in networked clouds." Proceedings of the 6th ACM International Conference on Future Internet Technologies, New York, NY, 2011, pp. 26-29; 4 pages.

Chowdhury, Mosharaf, et al. "Polyvine: policy-based virtual network embedding across multiple domains." In Proceedings of the second ACM SIGCOMM workshop on Virtualized infrastructure systems and architectures, pp. 49-56, 2010; 8 pages.

Dietrich, David, et al. "Multi-domain virtual network embedding with limited information disclosure." Proceedings of IFIP Networking Conference, May 2013; 9 pages.

Zhang, Qiong, et al. "Resource Orchestration for Optically Interconnected Distributed Data Centers (Invited)." APC 2015; 20 pages.

Zhang, Qiong, et al. "Service function chaining in multi-domain networks." Optical Fiber Communications Conference and Exhibition (OFC), IEEE, 2016; 3 pages.

Zhang, Qiong, et al. "Vertex-centric computation of service function chains in multi-domain networks." NetSoft Conference and Workshops (NetSoft), IEEE, 2016; 8 pages.

"Network functions virtualization (NFV); User Cases," www.etsi.org/deliver/etsi_gs/nfv/001_009/001/01.01.01_60/gs_nfv001v010101p.pdf; 50 pages, 2013.

Mehragham, S., et al. "Specifying and Placing Chains of Virtual Network Functions," *Proc. IEEE CloudNet*, Luxembourg; 7 pages, 2014.

Malewicz, G., "Pregel: A System for Large-Scale Graph Processing," in Proc ACM SIGMOD, New York, NY; 11 pages, 2010.

Farrel, A., et al., "A Path Computation Element (PCE)-Based Architecture," Network Working Group, 40 pages, 2006.

Vasseur, JP., et al., "A Backward-Recursive PCE-Based Computation (BRPC) Procedure to Compute Shortest Constrained Inter-Domain Traffic Engineering Label Switched Paths," IETF RFC 5441, 19 pages, 2009.

Heller, B., et al., "The Controller Placement Problem," Proc. ACM HotSDN, New York, NY; 6 pages, 2012.

Hong, S., et al., "Effective VON Embedding Based on Topology Aggregation in Multi-Domain Optical Networks," OFC 2014, M3H.3; 3 pages, 2014.

Y. Low, et al., "Distributed GraphLab: a framework for machine learning and data mining in the cloud," in *Proc. VLDB*, vol. 5, No. 8, 2012; 12 pages.

W. Liu, et al., "Service function chaining general use cases," IETF internet draft, draft-liu-sfc-use-cases-08, Sep. 2014; 20 pages.

* cited by examiner

DISTRIBUTED VIRTUAL NETWORK EMBEDDING

BACKGROUND

Field of the Disclosure

The present disclosure relates generally to network function virtualization and, more particularly, to systems and methods for performing virtual network request embedding over arbitrary topologies using distributed resource orchestration.

Description of the Related Art

Emerging network applications, such as cloud and big data applications, may involve joint consideration of IT resources residing within multiple domains within one or more data centers (DCs). Network function virtualization (NFV) can be used to virtualize network functions and migrate them from devices that are built for a single, specific purpose to multi-purpose virtual machines, which may reduce service deployment costs and improve service flexibility. As more service functions move to virtual machines in geographically distributed data centers and as more individually-managed Networks-on-Demand are enabled by software defined networking (SDN) technology, end-to-end network services may implement various mechanisms to coordinate resources across multi-domain networks. For example, a network service may traverse one or more consumer broadband networks, mobile backhaul networks, mobile packet core networks, and/or virtual private networks.

Traditional distributed routing protocols typically compute network paths without considering the availability of service functions and virtual machines at the individual network nodes. A hybrid architecture (e.g., one with geographically distributed orchestrators that replicate a global view of service functions, virtual machines, and networks) can lead to additional challenges, such as managing the global network state, maintaining the confidentiality of various network domains, and managing high computation complexity on a large-scale global view. An approach using path-computation element (PCE)-based multi-domain heuristics to map virtual optical network requests would typically require a parent PCE to compute all possible inter-domain paths. Furthermore, mapping a single virtual link would typically require signaling along all possible inter-domain paths, which can result in significant signaling overhead for a very large number of paths in a large-scale network.

A virtual network request can have a linear topology or a mesh topology. A service function chain is an example of a linear topology, while a VNF forwarding graph is an example of a mesh topology. Previously proposed virtual network mapping algorithms for multi-domain networks can be suitable for mapping service function chain (SFC) requests, but they typically require a centralized orchestrator to maintain a hierarchical topology for all domains in a multi-domain network. Previously proposed virtual network mapping algorithms for directly mapping an entire virtual network request in a mesh topology have high computational complexity in centralized systems and also have high operational and signaling complexity of virtual node placement at domains and (for multi-domain cases) inter-domain paths between virtual nodes in distributed systems.

SUMMARY

In one aspect, a disclosed method is for distributed virtual network embedding. The method may include receiving, at a resource orchestrator, a virtual network request specifying a set of virtual nodes, a set of virtual links, each of which connects two of the virtual nodes in a mesh topology for the virtual network request, and a resource requirement for at least one of the virtual nodes. The method may also include generating, by the resource orchestrator, a mapping solution for the virtual network request in which each virtual node in the set of virtual nodes is mapped to a respective one of a plurality of physical nodes, each physical node being represented as a vertex in a resource orchestration framework. Generating the mapping solution may include partitioning, by the resource orchestrator, the virtual network request into a plurality of sub-requests, where each sub-request specifies a linear topology for a subset of the virtual nodes and virtual links within the mesh topology for the virtual network request, and the plurality of sub-requests collectively include all virtual links within the mesh topology for the virtual network request, computing, independently for each sub-request, a respective chaining solution in which each virtual node in the subset of virtual nodes for which a linear topology is specified for the sub-request is mapped to a physical node on which resources sufficient for implementing the virtual node are available, and combining, by the resource orchestrator, the respective chaining solutions for each of the sub-requests.

In any of the disclosed embodiments, partitioning the virtual network request into a plurality of sub-requests may include identifying all linear topologies within the mesh topology for the virtual network request in which the number of links is less than or equal to a predetermined maximum number of links.

In any of the disclosed embodiments, partitioning the virtual network request into a plurality of sub-requests may include identifying a set of linear topologies within the mesh topology for the virtual network request in which the number of virtual links in any two of the linear topologies in the set of linear topologies differs by no more than one.

In any of the disclosed embodiments, partitioning the virtual network request into a plurality of sub-requests may include identifying a set of linear topologies within the mesh topology for the virtual network request in which there are no overlapping virtual links between the linear topologies in the set of linear topologies.

In any of the disclosed embodiments, for at least one of the sub-requests, computing the respective chaining solution may include computing two or more chaining solutions for the sub-request. Combining the respective chaining solutions for each of the sub-requests may include selecting one of the two or more chaining solutions computed for the at least one sub-request, and combining the selected chaining solution with respective chaining solutions for one or more sub-requests other than the at least one sub-request.

In any of the disclosed embodiments, for two or more of the sub-requests, the respective chaining solutions may be computed in parallel.

In any of the disclosed embodiments, the method may further include configuring, by one or more resource orchestrators in the resource orchestration framework, resources of one or more of the plurality of physical nodes for implementation of the respective virtual nodes to which they are mapped by the mapping solution generated for the virtual network request.

In any of the disclosed embodiments, at least two of the plurality of physical nodes may reside in different ones of a plurality of domains in a multi-domain network, and the resource orchestrator may be one of a plurality of resource orchestrators in the resource orchestration framework, each of which coordinates resource usage in a respective one of the plurality of domains.

In any of the disclosed embodiments, the virtual network request may further specify a resource requirement for at least one of the virtual links, and for at least one of the sub-requests, computing the respective chaining solution may include mapping a virtual node in the subset of virtual nodes for which a linear topology is specified for the sub-request to a physical node in response to determining that a physical link to the physical node meets the specified resource requirement for the at least one virtual link.

In any of the disclosed embodiments, for at least one of the sub-requests, computing the respective chaining solution may include identifying a first physical node at which a resource requirement for a first virtual node in the linear topology for the sub-request is met, mapping the first physical node to the first virtual node in a candidate chaining solution for the sub-request, determining that a resource requirement for a second virtual node in the linear topology for the sub-request is met on a second physical node, the second physical node being a neighbor of the first physical node, and mapping the second physical node to the second virtual node in the candidate chaining solution.

In any of the disclosed embodiments, for at least one of the sub-requests, computing the respective chaining solution may include sending, by the resource orchestrator to another resource orchestrator in a network domain other than the network domain in which the resource orchestrator resides, a controller message that includes a partially mapped candidate chaining solution for the sub-request, determining, by the other resource orchestrator, that a resource requirement for a given virtual node in the linear topology for the sub-request is met on a given physical node in the network domain other than the network domain in which the resource orchestrator resides, and mapping the given physical node to the given virtual node in the candidate chaining solution.

In another aspect, a disclosed resource orchestration framework may include a plurality of vertices, each of which represents a respective one of a plurality of physical nodes in a network, and a resource orchestrator. The resource orchestrator may include a processor, and a memory. The memory may store program instructions that when executed by the processor cause the processor to perform receiving a virtual network request specifying a set of virtual nodes, a set of virtual links, each of which connects two of the virtual nodes in a mesh topology for the virtual network request, and a resource requirement for at least one of the virtual nodes. When executed by the processor, the program instructions may further cause the processor to perform generating a mapping solution for the virtual network request in which each virtual node in the set of virtual nodes is mapped to a respective one of the plurality of physical nodes. Generating the mapping solution may include partitioning the virtual network request into a plurality of sub-requests, where each sub-request specifies a linear topology for a subset of the virtual nodes and virtual links within the mesh topology for the virtual network request, and the plurality of sub-requests collectively include all virtual links within the mesh topology for the virtual network request, initiating, for each sub-request, an independent computation of a respective chaining solution in which each virtual node in the subset of virtual nodes for which a linear topology is specified for the sub-request is mapped to a physical node on which resources sufficient for implementing the virtual node are available, and combining the respective chaining solutions for each of the sub-requests.

In any of the disclosed embodiments, partitioning the virtual network request into a plurality of sub-requests may include identifying all linear topologies within the mesh topology for the virtual network request in which the number of links is less than or equal to a predetermined maximum number of links.

In any of the disclosed embodiments, partitioning the virtual network request into a plurality of sub-requests may include identifying a set of linear topologies within the mesh topology for the virtual network request in which the number of virtual links in any two of the linear topologies in the set of linear topologies differs by no more than one.

In any of the disclosed embodiments, partitioning the virtual network request into a plurality of sub-requests may include identifying a set of linear topologies within the mesh topology for the virtual network request in which there are no overlapping virtual links between the linear topologies in the set of linear topologies.

In any of the disclosed embodiments, when executed by the processor, the program instructions further may cause the processor to perform configuring resources of one or more of the plurality of physical nodes for implementation of the respective virtual nodes to which they are mapped by the mapping solution generated for the virtual network request.

In any of the disclosed embodiments, at least two of the plurality of physical nodes may reside in different ones of a plurality of domains in a multi-domain network, and the resource orchestrator may be one of a plurality of resource orchestrators in the resource orchestration framework, each of which coordinates resource usage in a respective one of the plurality of domains.

In any of the disclosed embodiments, the virtual network request may further specify a resource requirement for at least one of the virtual links, and for at least one of the sub-requests, the independent computation of a respective chaining solution in which each virtual node in the subset of virtual nodes for which a linear topology is specified for the sub-request may be dependent on the specified resource requirement for the at least one virtual link.

In any of the disclosed embodiments, when executed by the processor, the program instructions may further cause the processor to perform, for at least one of the sub-request, identifying a first physical node at which a resource requirement for a first virtual node in the linear topology for the sub-request is met, mapping the first physical node to the first virtual node in a candidate chaining solution for the sub-request, determining that a resource requirement for a second virtual node in the linear topology for the sub-request is met on a second physical node, the second physical node being a neighbor of the first physical node, and mapping the second physical node to the second virtual node in the candidate chaining solution.

In any of the disclosed embodiments, for at least one of the sub-requests, initiating the independent computation of a respective chaining solution in which each virtual node in the subset of virtual nodes for which a linear topology is specified for the sub-request may include sending, to another resource orchestrator in a network domain other than the network domain in which the resource orchestrator resides, a controller message that includes a partially mapped candidate chaining solution for the sub-request.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
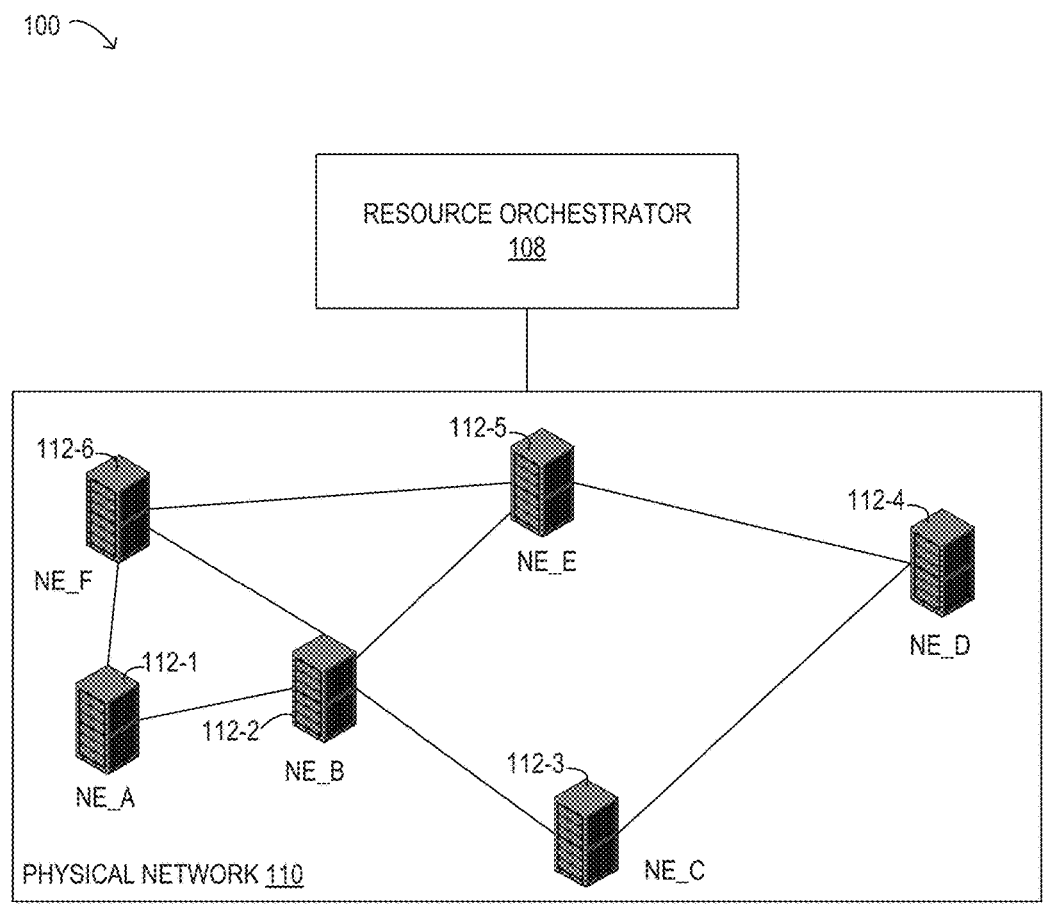
FIG. 1 illustrates selected elements of a distributed resource orchestration framework, according to at least some embodiments.

In the following description, details are set forth by way of example to facilitate discussion of the disclosed subject matter. It should be apparent to a person of ordinary skill in the field, however, that the disclosed embodiments are merely examples and are not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As will be described herein, a distributed resource orchestration framework is disclosed that provides a scalable vertex-centric distributed approach for identifying all qualified service function chain (SFC) solutions in a multi-domain network. In some embodiments, the distributed resource orchestration framework disclosed herein may apply a vertex-centric distributed processing approach that enables different vertices to exchange information about possible SFC solutions iteratively using controller messages until all possible solutions have been identified. In some embodiments of the distributed resource orchestration framework disclosed herein, each domain resource orchestrator managing the resources of a network domain may send messages to each vertex in its network domain, and the domain resource orchestrators may communicate with each other using controller messages. Simulation results have demonstrated superior efficiency and scalability for computing a large SFC request when compared to a centralized approach.

In some embodiments of the present disclosure, a distributed resource orchestration framework may perform distributed virtual network embedding for virtual network requests with arbitrary topologies, including mesh topologies. For example, as described in more detail below, resource orchestrators in a distributed resource orchestration framework may collaborate to partition a virtual network request over a mesh topology into multiple linear-topology sub-requests, to identify feasible mappings for each sub-request by applying, independently, a vertex-centric distributed processing approach to each sub-request, and to combine the feasible mappings for the sub-requests into a virtual network that satisfies the virtual network request. By only mapping linear topology chains, the message parsing in between the orchestrators and the message processing at each vertex may be simplified, when compared to other approaches to performing virtual network embedding. This approach may also make it easier to determine the forwarding path for messages than when using other approaches to performing virtual network embedding.

Turning now to the drawings, FIG. 1 illustrates selected elements of a distributed resource orchestration framework, according to at least some embodiments. More specifically, FIG. 1 illustrates an example embodiment of a network domain 100, which is based on vertices that are individual network elements (NE). In FIG. 1, network domain 100 is shown including domain-specific resource orchestrator 108, and physical network 110. In some embodiments, physical network 110 may be an underlying optical network, such as an optical transport network (OTN) or a flexible optical data plane (e.g., flexible transceivers) configured to adjust the bandwidth of connections.

In FIG. 1, resource orchestrator 108 may manage or coordinate the use of resources within network domain 100, shown comprising multiple network elements 112. Network elements 112 may represent various types of network functionality, such as switches, routers, etc., and may include hardware to interconnect various types of physical interfaces. Network domain 100 comprises network element NE_A 112-1, network element NE_B 112-2, network element NE_C 112-3, network element NE_D 112-4, network element NE_E 112-5, and network element NE_F 112-6, along with connections between the network elements that may have different distances. Thus, network domain 100 may represent a network topology for a single network domain, the use of whose resources are coordinated by resource orchestrator 108. Note that, in some embodiments, various network management functions for network domain 100 other than those provided by resource orchestrator 108 may be provided by a dedicated (e.g., domain-specific) SDN controller (not shown). When larger networks include multiple network domains, each individual network domain may be managed by a respective SDN controller.

As disclosed in further detail herein, network domain 100 may be included in a multi-domain network that uses a distributed processing approach and in which controller messages are exchanged between a plurality of resource orchestrators and/or network controllers, such as resource orchestrator 108 and/or an SDN controller, each of which is associated with a respective one of a plurality of network domains, such as physical network 110. In some embodiments, the resource orchestrators may work collaboratively to execute an SFC in the multi-domain network, which may include identifying all possible SFC solutions, selecting one or more of the possible SFC solutions for execution (e.g., dependent on user preferences or various policies), and configuring the physical resources of various network nodes to implement the selected solution(s). In some embodiments, the resource orchestrators may work collaboratively to perform distributed virtual network embedding for virtual network requests with arbitrary topologies.

As previously noted, network function virtualization (NFV) may be used to virtualize network functions and migrate them from devices that are built for a single, specific purpose to multi-purpose virtual machines on commercial off-the-shelf servers, which may reduce service deployment costs and improve service flexibility. Virtual networks may include a set of virtual links that connect a set of virtual nodes. For a given virtual network request, each virtual node may require a particular number of virtual machines (VMs), one or more particular network or service functions, or particular applications to be available on the underlying physical resources of the virtual node. In addition, for at least some virtual network requests, one or more of the virtual links that connect the virtual nodes may require a certain amount of bandwidth and may need to satisfy a particular delay constraint. In some embodiments, a virtual network in a Network Function Virtualization (NFV) framework may represent a service function chain, which has a linear topology. In other embodiments, a virtual network in a Network Function Virtualization (NFV) framework may represent a Virtual Network Function (VNF) forwarding graph, which has a mesh topology. In general, the techniques described herein for performing distributed virtual network embedding may be used to map the virtual nodes of a virtual network request over an arbitrary topology to physical resources, according to the required resources for the virtual nodes and/or for the virtual links that connect them in the arbitrary topology.

In systems that implement NFV, in order to provide an end-to-end network service, virtual network functions (VNFs) may need to be invoked in a sequential order, referred to as a service function chain (SFC). Service function chaining may involve configuring and/or allocating various virtual machines (VMs) to run these virtualized network functions, and may also involve steering traffic across one or more networks. For example, a traffic flow may be steered through a number of virtual network functions (VNFs) or service functions (SFs) in a specific order based on the service provider's policies and/or on user preferences. In some embodiments of the distributed resource orchestration frameworks described herein, service function chaining may be supported by the application of resource orchestration. For example, in some embodiments, a plurality of resource orchestration elements, referred to herein as resource orchestrators, may collectively and individually manage and coordinate the use of various resources (including service functions, virtual machines, and networks) at each data center, as well as the associated network resources to interconnect the VNFs. With the migration of VNFs to VMs in geographically distributed datacenters and the rollout of SDN controlled on-demand connectivity in IP/OTN networks, distributed resource orchestration across multi-domain networks, as described herein, may be highly beneficial for providing end-to-end network services. For example, a network service may span across multiple networks such as consumer broadband, mobile backhaul, mobile packet core, and/or virtual private networks (including, e.g., networks implemented on the 1Finity™ platform from Fujitsu Network Communications Inc.).

In various embodiments of the present disclosure, a large-scale multi-domain network may include many different domains, and these domains may have different network technologies, different vendors, different administration, different types of resources, and/or different virtualized networks. These domains may include domains in which reside Internet of Things (IoT) devices, computing resources, storage resources, and/or different types of service functions (including access service functions, metro service functions, and/or core service functions). In at least some embodiments, these multi-domain networks may preserve confidentiality among domains and improve scalability for service providers. In at least some of the multi-domain orchestration architectures described herein, each domain may be controlled by a local orchestrator, and vertex-centric distributed computing among the orchestrators may provide for end-to-end resource allocation.

Figure 2:
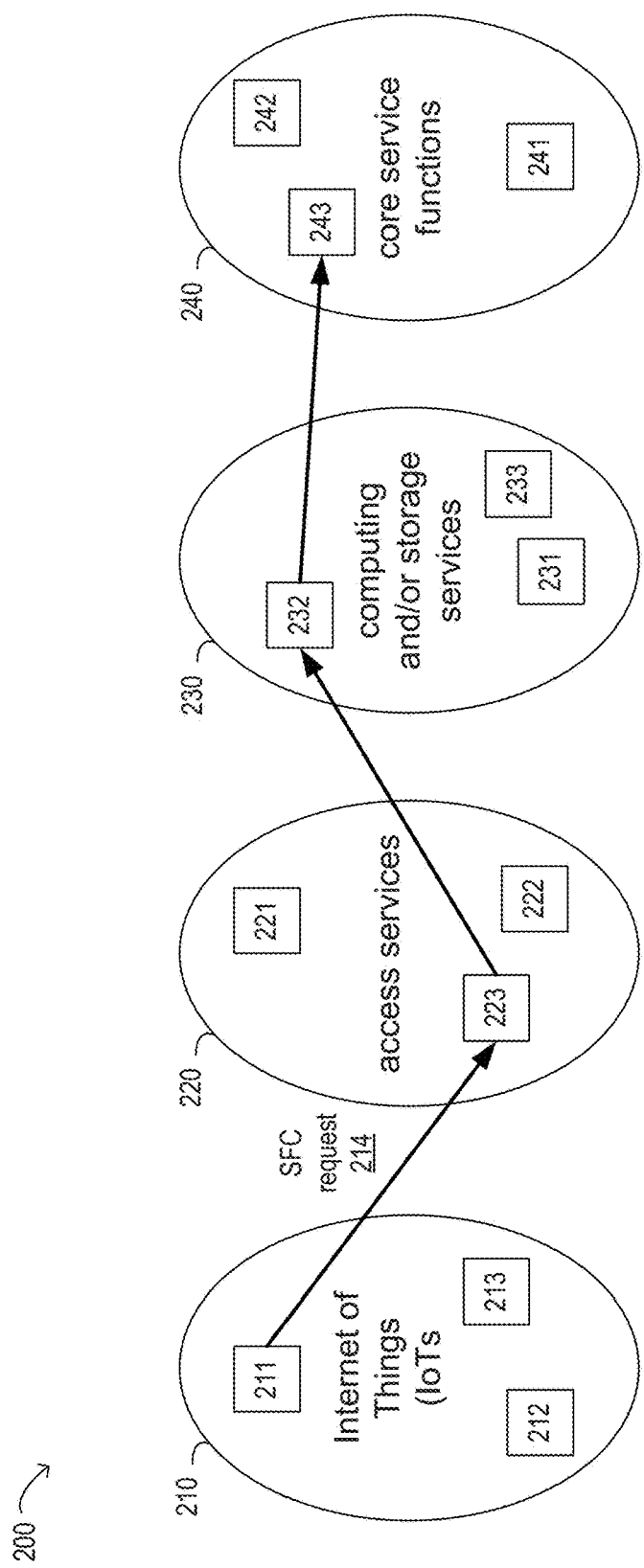
FIG. 2 is a block diagram illustrating selected elements of a multi-domain network for providing end-to-end services, according to one embodiment.

FIG. 2 is a block diagram illustrating selected elements of a multi-domain network for providing end-to-end services, according to one embodiment. In this example embodiment, multi-domain network 200 includes four domains, shown as domains 210, 220, 230, and 240. Each of these domains may include one or more nodes (vertices), at least some of which may implement one or more service functions using the resources within that domain. The first domain, domain 210, represents the Internet of Things (IoTs), various devices of which may issue service function chain requests or virtual network requests. Three such devices are illustrated in FIG. 2 as devices 211, 212, and 213, although any number of devices may be included in domain 210, in different embodiments. In this example embodiment, the second domain, domain 220, represents one or more data centers or other entities that provide access services that may be included in a service function chain or virtual network. Three such services are illustrated in FIG. 2 as services 221, 222, and 223, although any number of services or devices may be included in domain 220, in different embodiments.

In this example embodiment, the third domain, domain 230, represents one or more data centers or other entities that provide computing and/or storage services that may be included in a service function chain or virtual network. Three such services are illustrated in FIG. 2 as services 231, 232, and 233, although any number of services or devices may be included in domain 230, in different embodiments. In this example embodiment, the fourth domain, domain 240, represents one or more data centers or other entities that provide core service functions that may be included in a service function chain or virtual network. Three such services are illustrated in FIG. 2 as core service functions 241, 242, and 243, although any number of services or devices may be included in domain 240, in different embodiments.

In the example illustrated in FIG. 2, device 211 within domain 210 has issued a service function chain request 214, which includes at least one access service, one computing or storage service, and one core service function. More specifically, service function chain request 214 specifies a service function chain that includes an access service function 223 (which is available on one of the nodes/vertices within domain 220), a computing or storage service function 232 (which is available on one of the nodes/vertices within domain 230), and a core service function 243 (which is available on one of the nodes/vertices within domain 240).

In various embodiments, the systems described herein may perform vertex-centric distributed computing to identify all qualified service function chain (SFC) solutions for an SFC request, or may use vertex-centric distributed computing in performing virtual network embedding, in systems that include network function virtualization, mobile edge computing, and/or IoTs with data analytics, and in which traffic may traverse a collection of service function instances across multiple domains.

In at least some embodiments of the present disclosure, each domain in a multi-domain network may include physical nodes and physical links, such as IP/OTN links. In at least some embodiments, a respective resource orchestrator may be associated with each network domain to manage all the physical nodes and links within its domain. In some embodiments, each physical node may include network elements (e.g., an OTN switch, or a router) and/or compute servers and storage elements (e.g., datacenters) capable of invoking a subset of network or service functions selected from a catalog of such functions. Some examples of the network and service functions provided in these multi-domain networks include firewalls, deep packet inspection (DPI), network address translation (NAT), load balancers, and parental control functions. In one example, a service function chain may include a firewall, a deep packet inspection (DPI) service function, a parental control service function, and an anti-virus service function, each of which may be provided by nodes in a different network domain. In another example, a service function chain may include a network address translation (NAT) service function between two other types of service functions and/or between other service functions and an internet access service function, each of which is provided by nodes in a different network domain. In some embodiments, after identifying all feasible mappings of a service function chain request in a network, the results may be further pruned to obtain the service function chains that best satisfy the requestor's preferences and/or the service provider's constraints. Similarly, in some embodiments, after identifying all feasible mappings of a virtual network request, or of multiple sub-requests thereof, the results may be further pruned to obtain the virtual network that best satisfies the requestor's preferences and/or the service provider's constraints.

Figure 3:
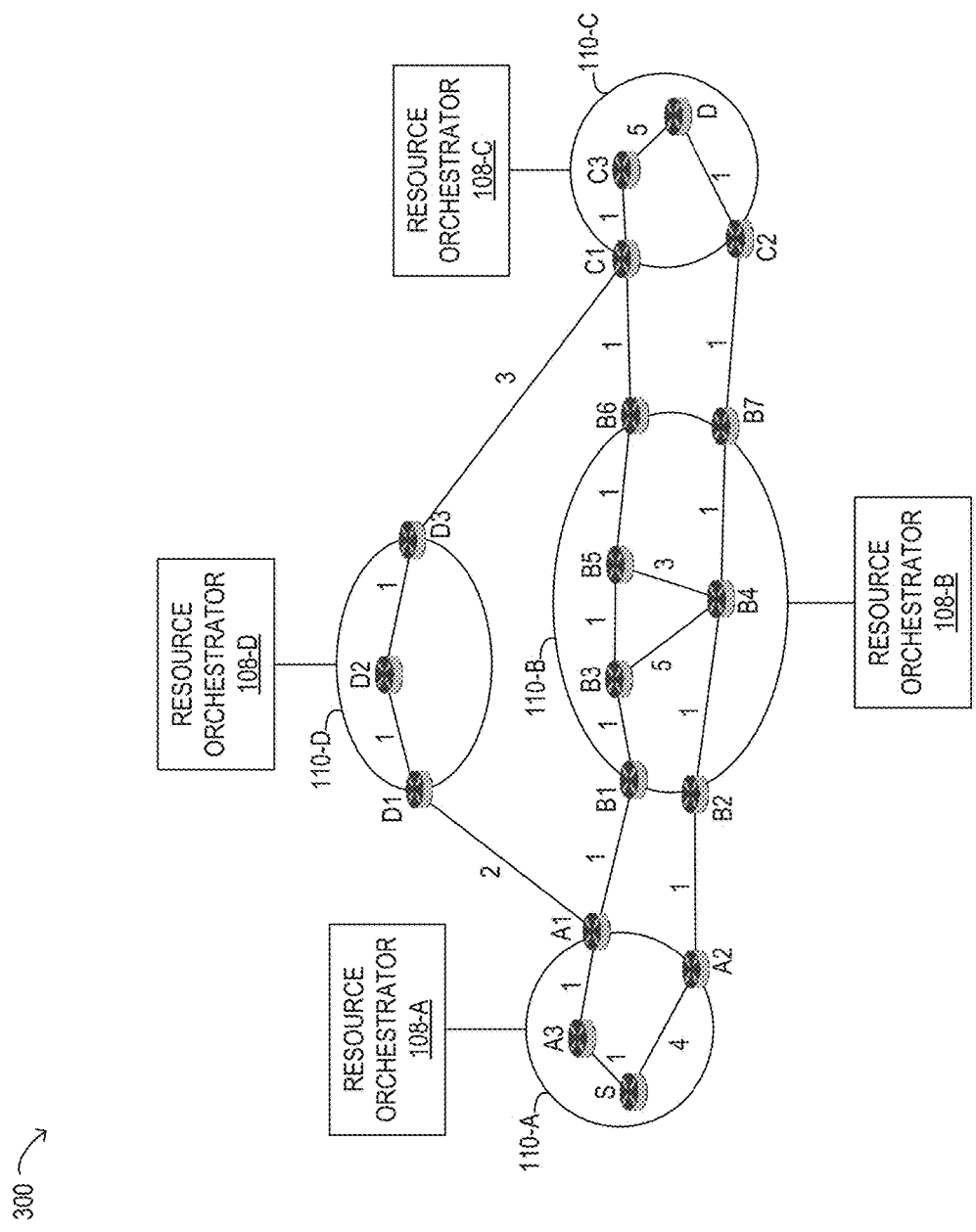
FIG. 3 is a network diagram illustrating selected elements of multiple distributed network domains, according to one embodiment.

Referring now to FIG. 3, selected elements of multiple distributed network domains are shown as a network diagram. In this example embodiment, the distributed network domains collectively represent an example of a multi-domain network 300 in which the use of resources for satisfying an SFC request is coordinated by a respective plurality of resource orchestrators 108, such as those illustrated in FIG. 1 and described herein. Although the distributed network domains within multi-domain network 300 are shown as a specific network topology, it will be understood that various different types and sizes of networks and different numbers of network domains may be used with the network service computation system disclosed herein. Note that the distributed network domains within multi-domain network 300 are shown as a schematic illustration and are not drawn to scale.

In FIG. 3, multi-domain network 300 includes a plurality of domains 110, each comprised of individual vertices. A vertex may represent any of a variety of network nodes, such as a switch, a router, a network element, a data center, a sub-network, a sub-domain, among others. Thus, each vertex may be enabled to provide network connectivity to other vertices, as well as computational resources, such as for providing network services and supporting network applications. As shown, a respective connection link is provided between pairs of vertices and is labeled in FIG. 3 with an integer value representing a relative path distance for the connection link. This relative path distance may represent a delay between the vertices or other edge information (e.g., bandwidth), in other embodiments. It is noted that the connection links may be intra-domain links or inter-domain links.

The vertices in multi-domain network 300 represent a reachable network of vertices that may provide potential paths between a source vertex S and a destination vertex D. In this example, each domain has a local orchestrator 108. For example, resource orchestrator 108-A may coordinate the use of resources within domain 110-A, which includes source vertex S, and vertices A1, A2, and A3; resource orchestrator 108-B may coordinate the use of resources within domain 110-B, which includes vertices B1, B2, B3, B4, B5, B6, and B7; resource orchestrator 108-C may coordinate the use of resources within domain 110-C, which includes vertices C1, C2, C3, and destination vertex D; and resource orchestrator 108-D may coordinate the use of resources within domain 110-D, which includes vertices D1, D2, and D3. In some embodiments of the distributed network domains shown within multi-domain network 300, each resource orchestrator 108 (and/or an SDN controller for the domain) may communicate with vertices in its own respective domain 110, while the vertices may refrain from communicating with each other.

In some embodiments, when computing service function chaining requests or chains mapping virtual network sub-requests, each vertex (node) may send and receive messages inside a compute function to and from its vertex neighbors. For example, vertex (node) A1 has three edges, as it has three vertex neighbors that it can communicate with, and a common compute function. Vertex A1 may also have node information indicating, for example, the number of compute resources available on the node, the number of storage resources available on the node, the vertex ID for the node, and the service functions that are implemented and available on the node. In at least some embodiments, the resource orchestrators associated with different domains may be interconnected via control channels for communication to compute requests (e.g., service function chaining requests or sub-requests of a virtual network request), based on the vertex-centric distributed processing described herein.

In at least some embodiments, the resource orchestrators (such as various ones of the resource orchestrators 108 illustrated in FIGS. 1 and 3) may communicate with each other and may be networked together using any suitable topology, such as a mesh, a ring, a star, or a bus, among others. Similarly, SDN controllers for the domains may communicate with each other and may be networked together using any suitable topology, such as a mesh, a ring, a star, or a bus, among others. In some embodiments, the communication among resource orchestrators 108 and/or among SDN controllers may employ a sideband network channel, or other network connection for management purposes, that does not otherwise interfere with the network connections between vertices, which may represent a payload network offered as a commercial service to customers by a service provider.

In at least some embodiments, the resource orchestrators (such as various ones of the resource orchestrators 108 illustrated in FIGS. 1 and 3) may send messages to each other to compute a final result for a distributed computation to solve a service function chain request or a virtual network request (or sub-request thereof). In such embodiments, each resource orchestrator may maintain a logical representation of the physical infrastructure of its own domain, where the vertices in the resource orchestration architecture represent the physical nodes in that domain. In at least some embodiments, in addition to maintaining vertex information (such as the node information described above), each vertex may also maintain information about its incoming and outgoing edges, and a common compute function, which is user-defined function. In at least some embodiments, for distributed computing among orchestrators, a computation may be broken down into iterations, called supersteps. In each superstep, each orchestrator may coordinate the execution of the compute functions of each vertex within its domain.

Figure 4:
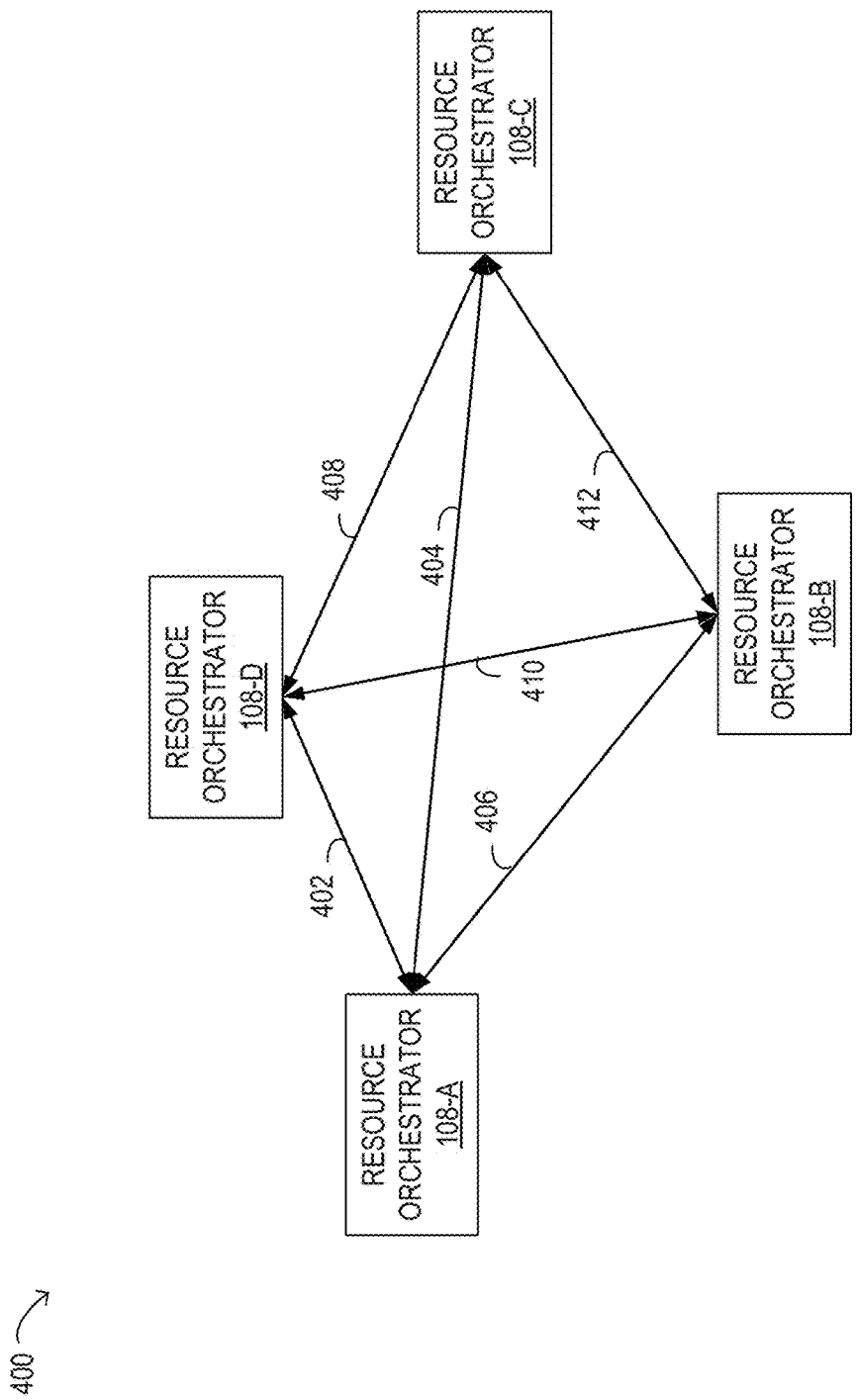
FIG. 4 illustrates a distributed resource orchestration architecture, including communication channels (or links) between respective resource orchestrators of different domains, according to one embodiment.

FIG. 4 illustrates a distributed resource orchestration architecture 400, including the communication channels (or links) between the respective resource orchestrators of the different domains illustrated in FIG. 3. In this example, the link between resource orchestrator 108-A (which coordinates the use of resources within domain 110-A) and resource orchestrator 108-B (which coordinates the use of resources within domain 110-B) is shown as link 406. Similarly, the link between resource orchestrator 108-A and resource orchestrator 108-C (which coordinates the use of resources within domain 110-C) is shown as link 404; the link between resource orchestrator 108-A and resource orchestrator 108-D (which coordinates the use of resources within domain 110-D) is shown as link 402; the link between resource orchestrator 108-B and resource orchestrator 108-D is shown as link 410; the link between resource orchestrator 108-C and resource orchestrator 108-D is shown as link 408; and the link between resource orchestrator 108-B and resource orchestrator 108-C is shown as link 412.

In the example illustrated in FIG. 3 and FIG. 4, there are four network domains, and each network domain may include multiple physical nodes and optical transport network (OTN) overlay links. Each physical node may be a switch, router, or data center that includes one or more virtual machines and that is capable of invocating a set of service functions. For example each physical node may be capable of providing a firewall, deep packet inspection (DPI), a WAN optimization controller (WOC), customer premises equipment (CPE), a provider edge (PE) or, in general, any type of service function.

In various embodiments of the present disclosure, a distributed resource orchestration framework and a vertex-centric distributed computing approach may be employed for finding all qualified SFCs in multi-domain networks. In some embodiments, after identifying all qualified chains, one or more SFCs may be selected for execution based on any suitable criteria. For example, an SFC may be selected for execution that best reflects user preferences for resource usage or other policy decisions. In another example, the lowest-cost disjoint SFC may be selected (e.g., to address protection concerns). In yet another example, multiple parallel SFCs may be selected for execution, according to a user preference or an applicable SFC selection policy. In some embodiments, a distributed resource orchestration framework and a vertex-centric distributed computing approach may be employed for finding all feasible mappings for a virtual network request (or sub-requests thereof) in multi-domain networks.

In at least some embodiments, an SFC request may include information specifying the following request elements: the service functions to be performed, the resources required to perform those service functions (e.g., the required number of virtual machines and/or storage resources), and delay or bandwidth requirements for the links between the nodes on which the different service functions in the chain are to be performed. Similarly, a virtual network request may include information specifying a set of virtual nodes and a corresponding set of virtual links connecting various pairs of the virtual nodes, specifying any required resources for particular ones of the virtual nodes, and/or specifying any required resources for particular ones of the virtual links.

Figure 5:
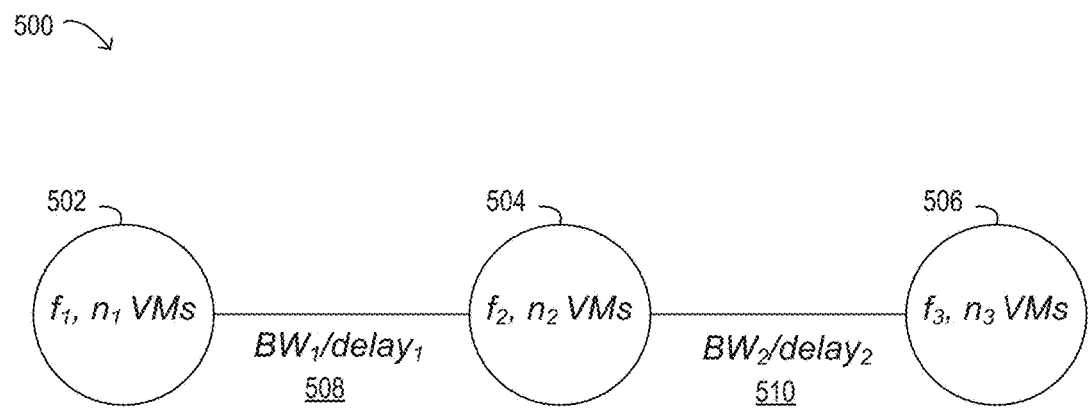
FIG. 5 depicts an abstraction of an example SFC request, according to one embodiment.

FIG. 5 depicts an abstraction of an example SFC request 500, according to one embodiment. In this example, to satisfy SFC request 500, the distributed resource orchestration mechanism may need to identify a first node 502 that includes $n_1$ virtual machines (VMs) and can perform a first service function, $f_1$; a second node 504 that includes $n_2$ virtual machines (VMs) and can perform a second service function, $f_2$; and a third node 506 that includes $n_3$ virtual machines (VMs) and can perform a third service function, $f_3$. In addition, the distributed resource orchestration mechanism may need to verify that the link between node 502 and node 504 meets a first set of bandwidth and/or delay requirements 508 (e.g., $BW_1$ and/or $delay_1$), and that the link between node 504 and node 506 meets a second set of bandwidth and/or delay requirements 510 (e.g., $BW_2$ and/or $delay_2$).

In contrast to other types of virtual network requests, SFC requests may include two unique characteristics: they may be more linear in topology, and they may be flexible in terms of the order in which the service functions are executed, in some cases. Based on these characteristics of SFC requests, the resource orchestration frameworks described herein may apply a vertex-centric distributed computing approach to solve service function chaining in multi-domain networks. In some embodiments, multiple service functions in an SFC can be mapped to a single physical node. In some embodiments, a linear-topology sub-request of a virtual network request may be represented using a depiction similar to that of SFC request 500. For example, a sub-request of a virtual network request may specify a first virtual node 502 that requires $n_1$ virtual machines (VMs) and a first service function, $f_1$; a second virtual node 504 that requires $n_2$ virtual machines (VMs) and a second service function, $f_2$; and a third virtual node 506 that requires $n_3$ virtual machines (VMs) and a third service function, $f_3$. The sub-request may also specify a first set of bandwidth and/or delay requirements 508 (e.g., $BW_1$ and/or $delay_1$) for the virtual link between virtual node 502 and virtual node 504, and a second set of bandwidth and/or delay requirements 510 (e.g., $BW_2$ and/or $delay_2$) for the virtual link between virtual node 504 and virtual node 506.

In some embodiments, an SFC request may specify a flexible-ordered service function chain for which any of multiple possible fixed-ordered chains, if found, would satisfy the request. For example, for a flexible-ordered service function chain $f_1*f_2*f_3$ any of six possible fixed-ordered chains, if found, would satisfy the request. These six fixed-ordered chains are $f_1 \cdot f_2 \cdot f_3$, $f_1 \cdot f_3 \cdot f_2$, $f_2 \cdot f_1 \cdot f_3$, $f_2 \cdot f_3 \cdot f_1$, $f_3 \cdot f_1 \cdot f_2$, and $f_3 \cdot f_2 \cdot f_1$. In this example, the symbol "*" between functions denotes a flexible ordering and the symbol "·" between functions denotes a fixed order.

As previously noted, in various embodiments, a vertex-centric distributed processing approach may include performing iterations of supersteps that are sequentially executed. Each superstep may involve receiving controller messages and/or other information at one or more resource orchestrators (such as various ones of the resource orchestrators 108 illustrated in FIG. 1, 3, or 4) or SDN controllers, performing local actions (in this case, executing a common compute function) at respective network domains 110, and then sending out controller messages to other resource orchestrators 108 or SDN controllers. In some embodiments, a vertex-centric distributed processing approach may be employed with a suitable network operating system using distributed network domains such as those illustrated in FIGS. 2, 3, and 4. In some embodiments, a resource orchestrator 108 or an SDN controller for each network domain 110 may keep track of the network topology of its respective network domain 110.

In some embodiments, the controller messages may be inter-domain messages sent with respect to a sending vertex and a target vertex that are in different domains. In some embodiments, each controller message may include: a sending vertex identifier; a target vertex identifier, and a minimum distance from source vertex S to the target vertex. In various embodiments, different numbers of supersteps may result in the identification of all possible solutions to a distributed computation for solving an SFC request, a virtual network request (or a sub-request thereof) or another type of distributed computation.

As previously noted, in some embodiments, each network domain may include (or be associated with) a respective resource orchestrator that manages (and coordinates the use of) the physical nodes and links within its domain. These distributed resource orchestrators may be interconnected by control channels (e.g., in-band control channels or out-of-band control channels, in different embodiments). In at least some embodiments, each orchestrator may store information about each physical node as a vertex data structure and may store information about each overlay OTN link as an edge data structure. In at least some embodiments, each vertex data structure may include a current value, a set of incoming/outgoing edges, and a common compute( ) function (an example embodiment of which is illustrated by pseudo-code shown later), which may be a user-defined function. In at least some embodiments, each edge data structure may include information about a respective OTN link, such as its bandwidth, delay information, information about the cost to use the link, and/or any other information usable in the system. In some embodiments, each vertex may be able to send and/or receive messages to and/or from other vertices. Messages may be delivered in memory (e.g., if they are exchanged between vertices that are within the same network domain or are controlled by the same orchestrator), while messages exchanged between vertices that are in different network domains or are controlled by different orchestrators may be delivered via various control channels.

Figure 6A:
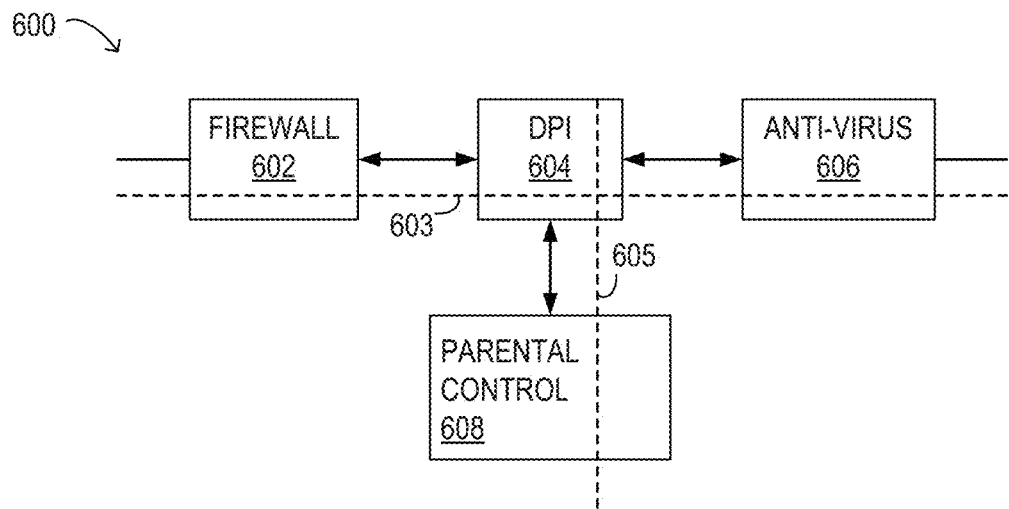
FIGS. 6A through 6D illustrate example mesh topologies for virtual networks to which the mechanisms for implementing distributed virtual network embedding may be applied, according to some embodiments.

FIGS. 6A through 6D illustrate example mesh topologies for virtual networks to which the mechanisms for implementing distributed virtual network embedding described herein may be applied, according to some embodiments. In these examples, virtual links are shown using solid arrows, and sub-requests are represented by dashed lines. For example, FIG. 6A illustrates a virtual network 600 containing four service or network functions 602, 604, 606, and 608, through which at least a portion of the network traffic passes. In this example, traffic first passes through a firewall 602, at which point some packets may be dropped. The remaining packets are forwarded to a Deep Packet Inspection (DPI) function 604. From DPI 604, some or all remaining packets may be forwarded to an anti-virus function 606 and/or to a parental control function 608 for further processing. Although the four service or network functions 602, 604, 606, and 608, and the links that connect them, are arranged in a mesh topology, in order to find a mapping solution for this virtual network, the mesh topology may be separated into multiple sub-requests, each having a linear topology, and mappings for each sub-request may be identified independently using a vertex-centric distributed computing approach, such as that described herein. Subsequently, the results may be combined to generate a solution for mapping virtual network 600 to physical nodes and links. In this example, a mapping for a chain of virtual nodes may be identified for a first linear sub-request (shown as 603), where the chain includes firewall 602 chained to DPI 604 and then to the anti-virus function 606. For a second sub-request (shown as 605), a mapping may be identified for a chain of virtual nodes that includes DPI 604, and parental control function 608. In this example, both of the two sub-requests include DPI 604. However, the two sub-requests do not share any overlapping links between the service and/or network functions of the mesh topology.

Figure 6B:
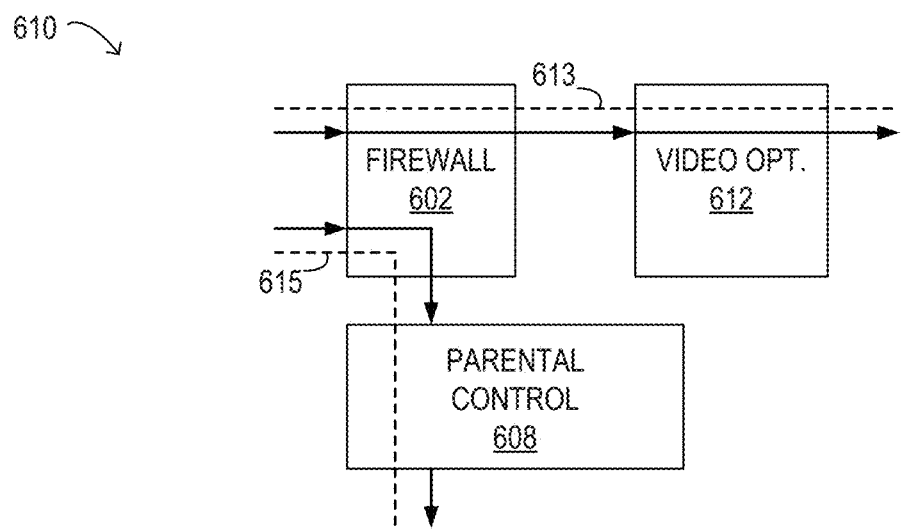

Another example of a virtual network having a mesh topology is illustrated in FIG. 6B. In this example, virtual network 610 includes a firewall 602, a video optimization function 612, and a parental control function 608. In order to find a mapping solution for this virtual network, the mesh topology may be separated into a first linear sub-request 613, which includes firewall 602 and video optimization function 612, and a second linear sub-request 615, which includes a firewall 602 and a parental control function 608. Mappings for each of these sub-requests may be identified independently using a vertex-centric distributed computing approach, such as that described herein, after which the results may be combined to generate a solution for mapping virtual network 610 to physical nodes and links. In this example, both of the two sub-requests include firewall 602. However, the two sub-requests do not share any overlapping links between the service and/or network functions of the mesh topology.

Figure 6C:
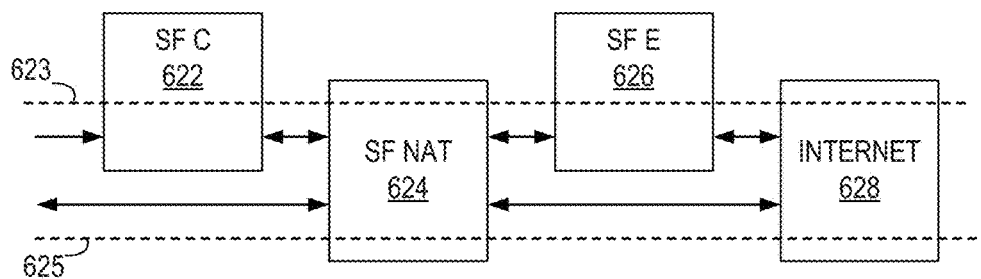

A third example of a virtual network having a mesh topology is illustrated in FIG. 6C. In this example, virtual network 620 includes a service function (SF) C 622, a service function (SF) E 626, a service function for network address translation (SF NAT) 624, and an internet function 628. In order to find a mapping solution for this virtual network, the mesh topology may be separated into a first linear sub-request 623, which includes all four of the service and/or network functions of the mesh topology, and a second linear sub-request 625, which includes only SF NAT 624 and internet function 628. Mappings for each of these sub-requests may be identified independently using a vertex-centric distributed computing approach, such as that described herein, after which the results may be combined to generate a solution for mapping virtual network 620 to physical nodes and links. In this example, both of the two sub-requests include SF NAT 624 and internet function 628. However, the two sub-requests do not share any overlapping links between the service and/or network functions of the mesh topology.

Figure 6D:
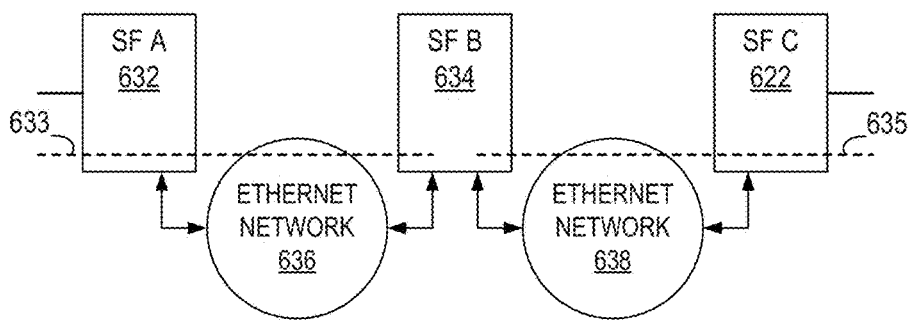

A fourth example of a virtual network having a mesh topology is illustrated in FIG. 6D. In this example, virtual network 630 includes a service function (SF) A 632, a service function (SF) B 634, a service function (SF) C 622, an Ethernet network 636, and an Ethernet network 638. In order to find a mapping solution for this virtual network, the mesh topology may be separated into a first linear sub-request 633, which includes SF A 632, Ethernet network 636, and SF B 634, and a second linear sub-request 635, which includes SF B 634, Ethernet network 638, and SF C 622. Mappings for each of these sub-requests may be identified independently using a vertex-centric distributed computing approach, such as that described herein, after which the results may be combined to generate a solution for mapping virtual network 630 to physical nodes and links. In this example, both of the two sub-requests include SF B 634. However, the two sub-requests do not share any overlapping links between the service and/or network functions of the mesh topology.

The virtual networks illustrated in FIGS. 6A through 6D are merely examples of virtual networks having mesh topologies. However, the techniques described herein for performing distributed virtual network embedding may be used to identify feasible mappings from the virtual nodes of any arbitrary virtual network to physical nodes, in different embodiments. In addition, the partitioning solutions shown for the virtual networks illustrated in FIGS. 6A through 6D are merely examples of partitioning solutions for these virtual networks. Other partitioning solutions may be possible for these virtual networks, in other embodiments.

As noted above, previously proposed virtual network mapping algorithms for directly mapping an entire virtual network request in a mesh topology have high computational complexity in centralized systems and also have high operational/signaling complexity of virtual node placement at domains and (for multi-domain cases) inter-domain paths between virtual nodes in distributed systems. For example, some proposed approaches address the problem of virtual network embedding in multi-domain networks, in which each domain has a part of a topology, based on a centralized framework in which a centralized orchestrator maintains a hierarchical topology database for all network domains in order to decide the inter-domain paths. This approach may have limitations in terms of scalability and potential inconsistency in network state, and the centralized framework may be unable to preserve confidentiality. Others have proposed distributed virtual network embedding algorithms in multi-domain networks in which an entire virtual network request is relayed across multiple domains until the completion of the virtual network embedding. The virtual network request is partially mapped in each domain based on the resource availability in each domain. However, this approach relies on a global view of resources when making decisions about the inter-domain paths on which to relay virtual network requests. Still others have proposed the use of a traffic-matrix based virtual network representation, and the collection of information about node types/costs in each domain, border nodes, and link costs between border nodes at a centralized repository, which is not scalable for large-scale networks.

In work directed to SFC requests, it has been shown that vertex-centric distributed computing has superior efficiency and scalability for linear topologies. In various embodiments of the systems described herein, resource orchestrators in a distributed resource orchestration framework may collaborate to partition a virtual network request over a mesh topology into multiple linear-topology sub-requests, to identify feasible mappings for each sub-request by applying, independently, a vertex-centric distributed processing approach to each sub-request, and to combine the feasible mappings for the sub-requests into a virtual network that satisfies the virtual network request. Given a virtual network request and a physical network whose topology can be partitioned and managed at distributed orchestrators, an objective of the distributed resource orchestration framework may be to find all feasible mappings of the virtual network request to the physical network. While several of the examples presented herein describe virtual network embedding techniques in terms of their application in a physical network that can be partitioned and managed at distributed orchestrators, in various embodiments, these techniques may be applied in centralized environments as well as in distributed environments.

Figure 7:
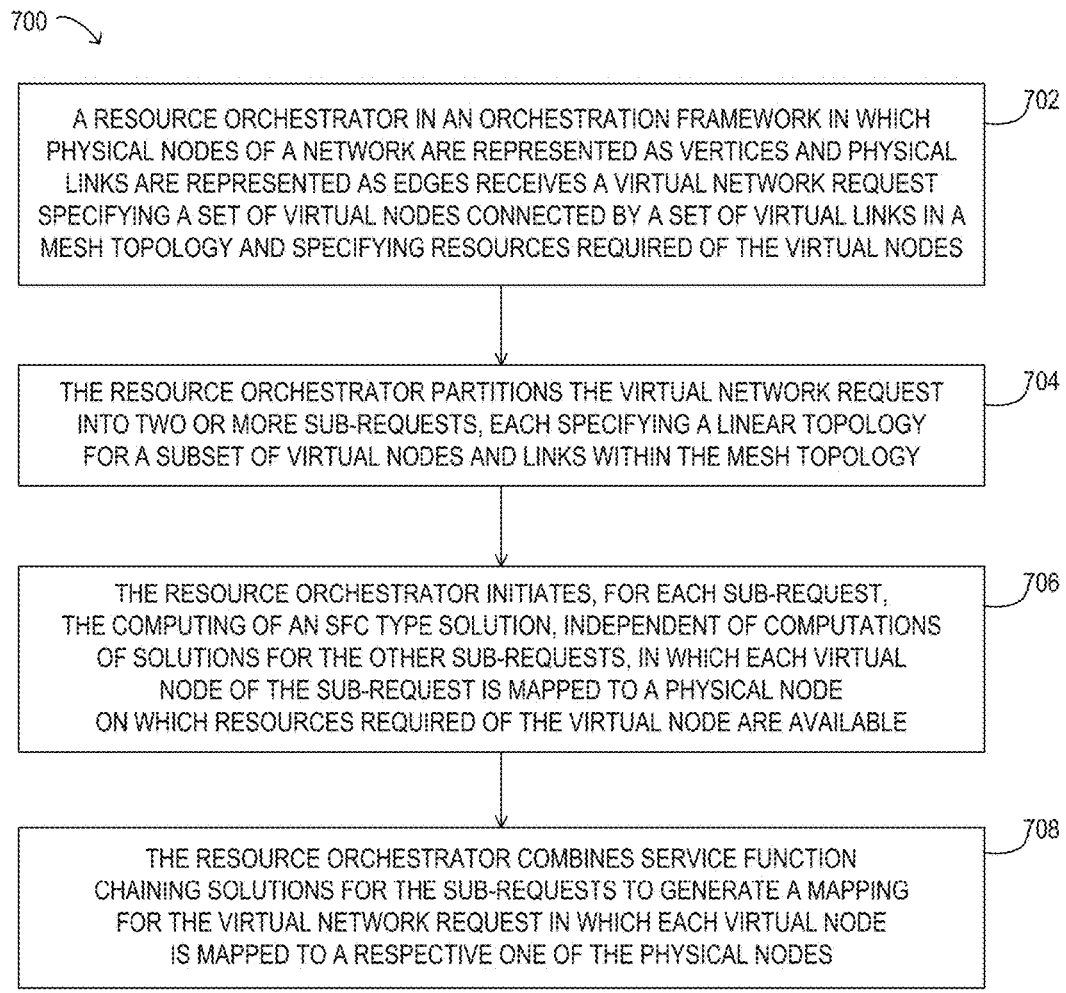
FIG. 7 is a flow diagram illustrating selected elements of a method for performing distributed virtual network embedding, according to one embodiment.

FIG. 7 is a flow diagram illustrating selected elements of a method 700 for performing distributed virtual network embedding, according to one embodiment. In some embodiments, method 700 may be performed by a master resource orchestrator on one of the physical nodes in a network of physical nodes to which the request is being mapped. In some embodiments, the network may be a multi-domain network. In this example embodiment, the method includes (at 702) a resource orchestrator in an orchestration framework in which physical nodes of a network are represented as vertices and physical links are represented as edges receiving a virtual network request that specifies a set of virtual nodes connected by a set of virtual links in a mesh topology and that specifies resources required of at least some of the virtual nodes. For example, the virtual network request may specify that a given virtual node requires a particular number of virtual machines (VMs) or that a given virtual node requires one or more particular network or service function(s) or application(s). In some embodiments, the virtual network request may also specify resources required of at least some of the virtual links, such as a certain amount of bandwidth or the satisfaction of certain delay requirements.

In the example embodiment illustrated in FIG. 7, method 700 may also include (at 704) the resource orchestrator partitioning the virtual network request into two or more sub-requests, each specifying a linear topology for a subset of virtual nodes and virtual links within the mesh topology. In some embodiments, two or more of the sub-requests may include a shared virtual node. In some embodiments, there may be no overlapping virtual links between any of the sub-requests. In some embodiments, the partitioning may produce a minimum set of linear-topology sub-requests for which there are no overlapping virtual links. Example methods for performing the partitioning are described in more detail below, according to some embodiments.

Method 700 may also include (at 706) the resource orchestrator initiating, for each sub-request, the computing of a service function chaining (SFC) type solution for mapping each of the virtual nodes of the linear topology of the sub-request to a physical node on which resources required of the virtual node are available. In some embodiments, the SFC type solutions may be identified using a vertex-centric distributed computing approach, such as that described herein. The solutions may be computed independently for each of the sub-requests. In some embodiments, the chaining solutions for two or more sub-requests may be computed in parallel. In other embodiments, the chaining solutions for the sub-requests may be computed sequentially. In some embodiments, two or more feasible solutions for mapping the virtual nodes of the linear topology of a given sub-request to physical nodes may be identified.

Method 700 may also include (at 708) the resource orchestrator combining the chaining solutions for the sub-requests to generate a mapping for the original virtual network request in which each virtual node is mapped to a respective one of the physical nodes. In some embodiments, this may include selecting one of two or more feasible solutions identified for one or more of the sub-requests. Example methods for combining the service function chaining solutions for the sub-requests to generate a mapping for the original virtual network request are described in more detail below, according to some embodiments.

In various embodiments of the present disclosure, different approaches may be taken to partitioning a virtual network request over a mesh topology into multiple linear-topology sub-requests. With any of these approaches, given a virtual network request, the objective is to partition a virtual network request to a minimum set of linear topologies that collectively reflect the virtual network request. In some embodiments, one or more constraints may be applied to the partitioning operation. Adherence to these constraints may serve to reduce the computation complexity when combining the results of applying vertex-centric distributed processing to identify feasible mappings for each of the sub-requests (e.g., by reducing the number of feasible mapping options identified for each sub-request) while also improving the overall performance of the vertex-centric distributed processing itself for all linear-topology sub-requests. In various embodiments, the values of the partitioning constraints described herein, or other partitioning constraints, may be default values for the network, may be determined and applied by the master resource orchestrator based on available resources, current conditions or workloads on the network, or various applicable system-wide, network-specific, request-specific, or customer-specific partitioning policies, or may be configurable by the requestor, in which case they may be specified for a particular virtual network request (e.g., in the virtual network request itself). In at least some embodiments, the partitioning of a virtual network request into a minimum set of linear-topology sub-requests according to various constraints may be an NP-complete problem solvable using heuristics such as those described herein or other heuristics.

In some embodiments, there may be a constraint specifying that there should be no overlapping links among the resulting set of linear topologies. For example, each overlapping link may result in more supersteps, more messages exchanged between orchestrator, potentially longer computation delays, and more complexity when applying vertex-centric distributed processing to identify feasible mappings for each of the sub-requests and/or when combining the results of that processing to generate an overall solution for the virtual network request. In other words, adherence to this constraint may cause a virtual network request to be partitioned into fewer linear-topology sub-requests than might otherwise be the case, resulting in fewer total messages exchanged, fewer feasible mappings for each longer sub-request, and fewer potential combinations of sub-request feasible mappings to be considered.

In some embodiments, there may be a constraint specifying that the lengths of the sub-requests, following partitioning of a virtual network request, should be balanced. For example, the constraint may specify that the difference between the lengths of any two sub-requests should be less than or equal to one. This may serve to reduce the time that it takes to perform the vertex-centric distributed processing to identify feasible mappings for each of the sub-requests, even when two or more sub-requests are processed in parallel, as there would not be one computation that takes much longer than the others and on which the master orchestrator would need to wait before combining feasible mappings for the sub-requests. For example, the system time required to perform the vertex-centric distributed processing may be largely based on the number of supersteps that need to be run, and the number of supersteps that need to be run is dependent on the maximum length of the linear topologies being processed at a given point in time, with the number of supersteps increasing as the maximum length of the linear topologies increases.

In some embodiments, there may be a constraint specifying the maximum length of any sub-request resulting from the partitioning of a virtual network request. However, the higher the value of this constraint (and thus the longer the linear topologies into which the virtual network request is partitioned), the fewer feasible mappings there will be for each sub-request, which simplifies the computation complexity, as described above. In some embodiments, there may be a delay constraint specifying that the maximum number of virtual links among any sub-request is no larger than a predetermined threshold value, T.

In some embodiments, if there are multiple partitioning options having the same maximum sub-request length, a partitioning solution in which there are higher resource requirements for virtual nodes at, or near, the beginning of a linear topology may be preferred, since there may be fewer vertices and corresponding edges that can satisfy the requirements, resulting in fewer feasible mappings and fewer successfully mapped messages exchanged between virtual nodes in subsequent positions within the linear topology.

In some embodiments, a master resource orchestrator may apply a shortest-first approach to the partitioning of a virtual network request. Using this approach, the mesh topology of the virtual network request may be partitioned into the shortest, equal-length, linear topologies first, after which these linear topologies may be one additional virtual node at a time until a length/delay constraint is reached. Once all possible linear topologies of a given length have been identified, the master resource orchestrator may identify a set of set of linear topologies of the given length (and/or a length that is one less than the given length) that contains all of the virtual links in the mesh topology, but has no overlapping links.

Figure 8:
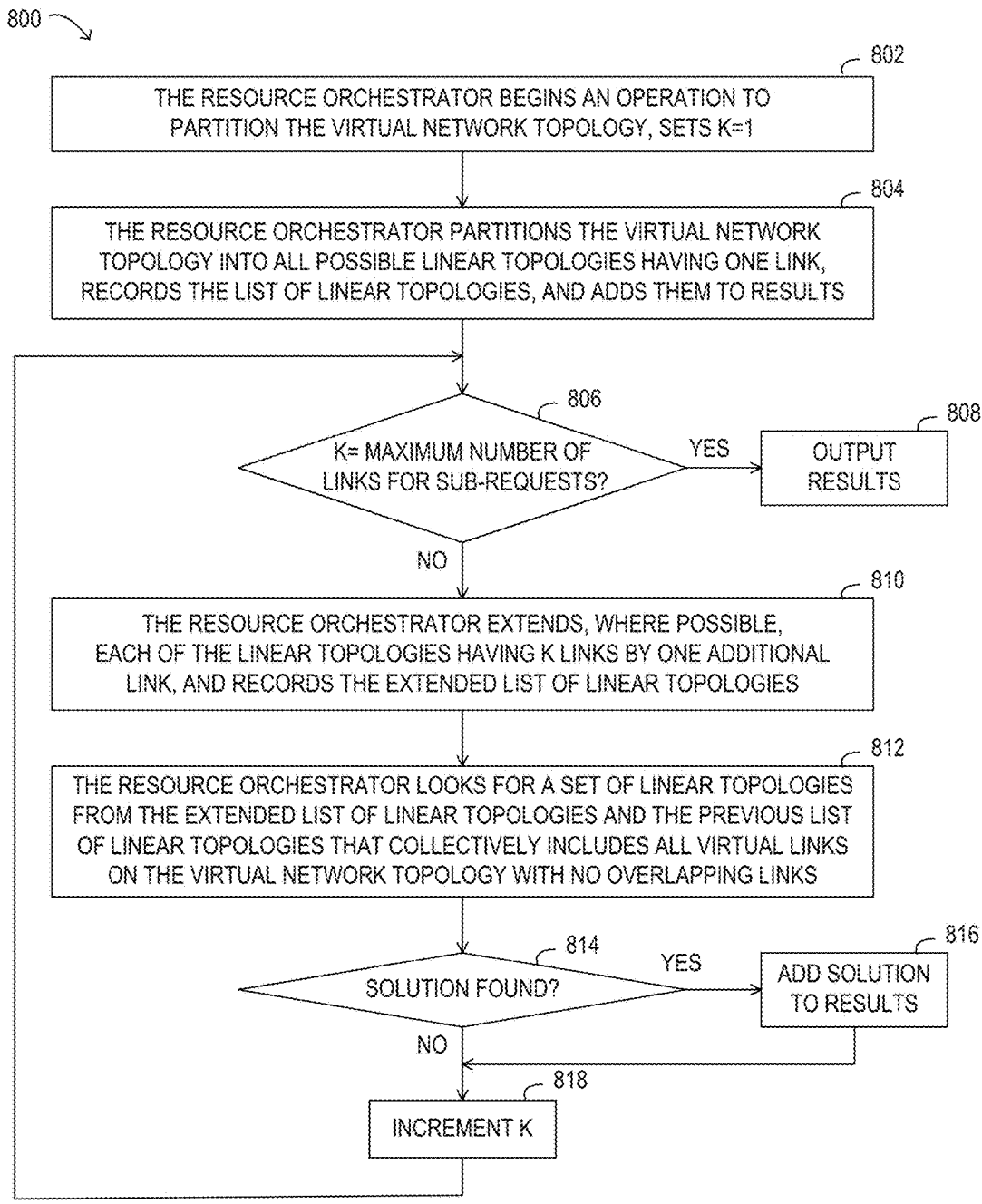
FIG. 8 is a flow diagram illustrating selected elements of a method for partitioning a virtual network request having a mesh topology into multiple sub-requests, each of which has a linear topology, according to one embodiment.

FIG. 8 is a flow diagram illustrating selected elements of a method 800 for partitioning a virtual network request having a mesh topology into multiple sub-requests, each of which has a linear topology, according to one embodiment. In some embodiments, method 800 may be performed by a master resource orchestrator on one of the physical nodes in a network of physical nodes to which the virtual network request is to be mapped. In some embodiments, the network may be a multi-domain network. In this example, method 800 employs a shortest-first approach to the partitioning, such as that described above. Method 800 includes (at 802) the resource orchestrator beginning an operation to partition the virtual network topology, and sets an indicator of the current linear topology length K to a value of 1. Method 800 also includes (at 804) the resource orchestrator partitioning the virtual network topology into all possible linear topologies having one link, recording these linear topologies in a list (e.g., a $List_K$) and adding them to a set of results (e.g., set of results $s_k$).

At 806, it may be determined (e.g., by the resource orchestrator) whether or not K is equal to a predetermined maximum number of virtual links for each sub-request (e.g., a predetermined threshold value, T). If so, method 800 may proceed to 808, where the current results of the partitioning operation (e.g., set of results $s_k$) are output and the partitioning operation may be complete. If not, method 800 may continue at 810. At 810, method 800 may include the resource orchestrator extending, where possible, each of the linear topologies having K links by one additional virtual link to a corresponding neighbor of the last virtual node in the linear topology, and recording the extended list of linear topologies (e.g., as $List_{K+1}$).

Figure 9:
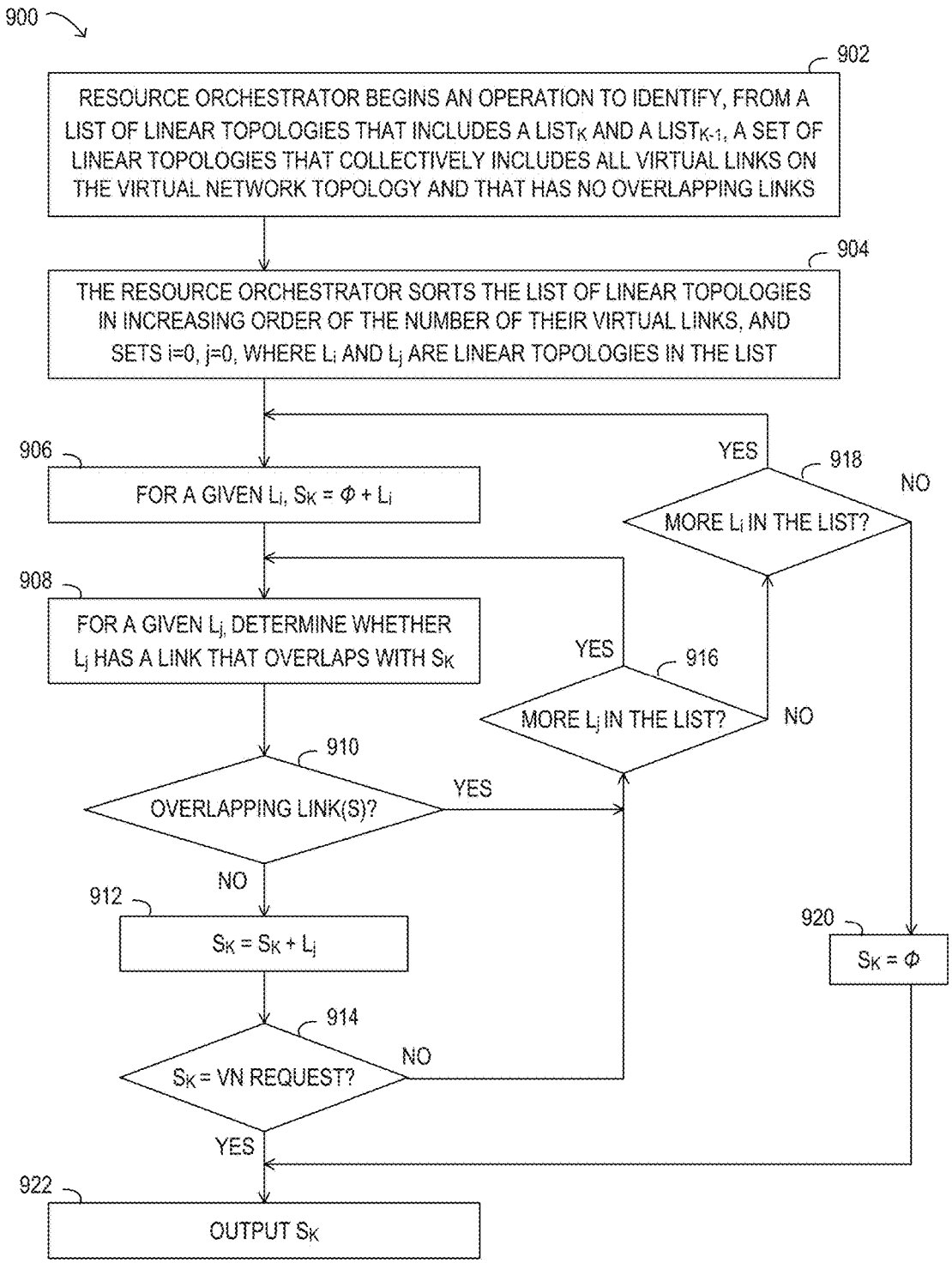
FIG. 9 is a flow diagram illustrating selected elements of a method for identifying a set of linear topologies from an extended list of linear topologies and the previous list of linear topologies that collectively includes all virtual links on the mesh topology for the virtual network request with no overlapping links, according to one embodiment.

Method 800 may include (at 812) the resource orchestrator looking for a set of linear topologies from the extended list of linear topologies and the previous list of linear topologies that collectively includes all virtual links on the mesh topology for the virtual network request with no overlapping links. An example method 900 for identifying such a set of linear topologies is illustrated in FIG. 9 and described below, according to one embodiment. If (at 814) a solution is found, the solution may be added to the results (e.g., set of results $s_k$) at 816. Otherwise, there may be no change to the results. Method 800 may include (at 818) incrementing K and returning to 806. In this case, one or more of the operations shown as elements 808-818 in FIG. 8 may be repeated for each additional value of K until the value of K reaches the predetermined maximum number of virtual links for each sub-request (T), after which the cumulative results up to that point (e.g., the set of results $s_k$) may be output (at 808).

FIG. 9 is a flow diagram illustrating selected elements of a method 900 for identifying a set of linear topologies from an extended list of linear topologies and the previous list of linear topologies that collectively includes all virtual links on the mesh topology for the virtual network request with no overlapping links, according to one embodiment. The method may include iteratively examining the virtual links in each linear topology, within two nested loops, to determine whether or not they are also included in another linear topology. For example, the orchestrator may add a first linear topology to a temporary result set. The resource orchestrator may then search each other linear topology, one at a time, to see if it includes any links that overlap with the linear topology in the temporary result set. If none of the links of a given linear topology overlap with those of the linear topology, they may be added to the temporary result set. If no solution is identified, the temporary result set may be cleared and the process may repeated starting with a different initial linear topology.

In some embodiments, method 900 may be performed by a master resource orchestrator on one of the physical nodes in a network of physical nodes to which the virtual network request is to be mapped. In some embodiments, the network may be a multi-domain network. In some embodiments, the linear topologies that make up the final set of linear topologies may include linear topologies from at most two lists of linear topologies corresponding to consecutive values of K. In other words, to complete a set of linear topologies in which the maximum number of links for any sub-request is equal to a given value of K, the resource orchestrator may consider only the linear topologies having K links (e.g., those on a $List_K$) or K-1 links (e.g., those on a $List_{K-1}$). This may guarantee that the linear topologies in the final set of linear topologies are well balanced, with all of them having the same length, or there being a difference between the lengths of the shortest and longest sub-requests in the set of no more than one link.

In this example, method 900 may include (at 902) a resource orchestrator beginning an operation to identify, from a list of linear topologies that includes a $List_K$ and a $List_{K-1}$, a set of linear topologies that collectively includes all virtual links on the mesh topology for the virtual network request with no overlapping links. Method 900 may include (at 904) the resource orchestrator sorting the list of linear topologies in increasing order of the number of their virtual links, and setting i=0, j=0, where $L_i$ and $L_j$ are linear topologies in the list.

At 906, for a given linear topology $L_i$, method 900 may include the resource orchestrator recording the current results as $S_K = \Phi + L_i$, where $S_K$ represents the current results and $\Phi$ represents the empty set. At 908, for a given $L_j$, the method may include determining whether or not $L_j$ includes a link that overlaps with a link already in $S_K$. If (at 910) there are overlapping links, method 900 may proceed to 916. At 916, if there are more linear topologies $L_j$ on the list, method 900 may return to 908. Otherwise, method 900 may proceed to 918. If (at 918) there are more linear topologies $L_i$ on the list, method 900 may return to 906. Otherwise, method 900 may proceed to 920. At 920, since no feasible solution has been identified, method 900 may include resetting the current results to the empty set as $S_K = \Phi$, after which this result may be output (at 922).

If (at 910) there are no overlapping links, method 900 may continue at 912. At 912, method 900 may include the resource orchestrator updating the current results as $S_K = S_K + L_j$. In other words, the linear topology $L_j$ may be added to the current results $S_K$. If (at 914) the current results $S_K$ now satisfy the virtual network request, they may be output by the resource orchestrator as an identified set of linear topologies from an extended list of linear topologies and the previous list of linear topologies that collectively includes all virtual links on the mesh topology for the virtual network request with no overlapping links (at 922).

In some embodiments, once a solution has been identified, meaning that a set of linear topologies has been identified that collectively includes all virtual links on the mesh topology with no overlapping links, no further attempts to identify such a set may be performed. In other embodiments, one or more additional attempts may be made to identify such sets. In some embodiments, if two or more such sets are identified, one or more feasible mappings to physical nodes may be identified for each of them and they may all be considered when attempting to combine feasible mappings to generate a solution for the virtual network request. In some embodiments, the linear topology that serves as the initial linear topology $L_i$ may be chosen at random. In other embodiments, the linear topology that serves as the initial linear topology $L_i$ may be chosen based on its position within the list of identified linear topologies (e.g., it may be the first linear topology that was identified), based on the resources required of one or more of the virtual nodes in the linear topology, or using other criteria. Similarly, linear topologies other than the initial linear topology $L_i$ (e.g., the linear topology that serves as the initial linear topology $L_j$) may be examined and compared with the temporary results in a random order, in order of their positions within the list of identified linear topologies, in an order that is based on the resources required of one or more of the virtual nodes in the linear topologies, or in an order that is based on other criteria, in different embodiments.

Figure 10:
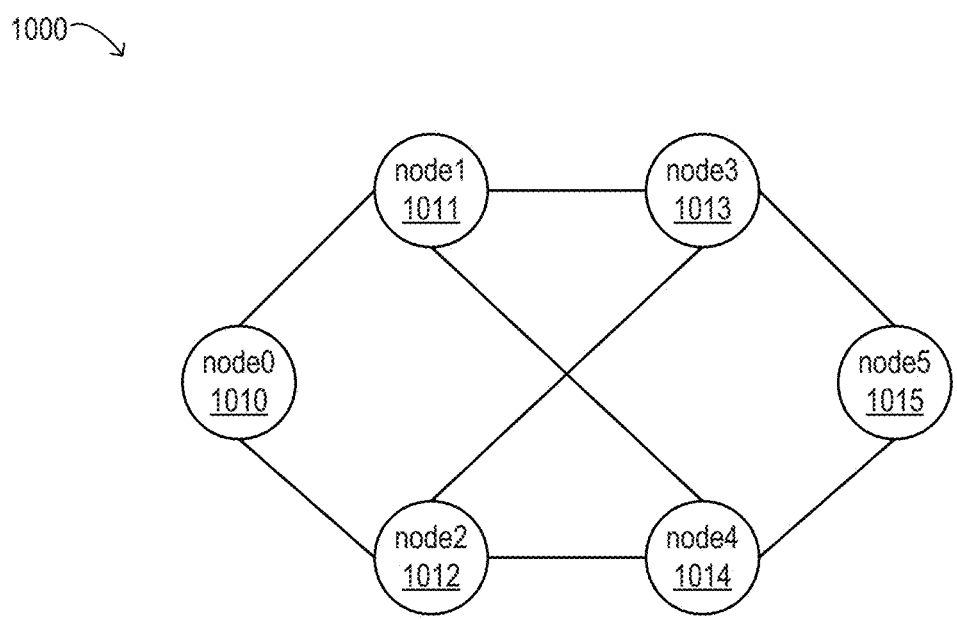
FIG. 10 illustrates an example virtual network request that has a mesh topology.

The techniques for performing distributed virtual embedding described herein may be further illustrated by way of their application to an example virtual network request. FIG. 10 illustrates an example virtual network request 1000 that has a mesh topology. In this example, the virtual network request includes six virtual nodes, shown as node 0 (1010), node 1 (1011), node 2 (1012), node 3 (1013), node 4 (1014) and node 5 (1015). These six virtual nodes are connected to each other in a mesh topology that includes eight virtual links. For example, respective virtual links connect node 0 to node 1 and to node 2. Additional links connect node 1 to node 3 and to node 4. Other links connect node 2 to node 3 and to node 4, connect node 3 to node 5, and connect node 4 to node 5. In this example, it is assumed that the maximum number of links on any sub-requests (T) is 4. In this example, the results of applying the shortest-first approach to partitioning virtual network request 1000 into sub-requests having linear topologies, as described in more detail below, are shown in Table 1 below.

shortest-first approach. For example, in the first row under the column with the heading K=1 are listed all possible linear topologies within the mesh topology for virtual network request 1000 that have a single virtual link connecting two virtual nodes. Since each linear topology is defined by a single unique link between two virtual nodes, there are no overlapping links between the linear topologies listed in the first row. Therefore, the resulting set of linear topologies in the second row is the same as the list of linear topologies in the first row, and it includes 16 linear topologies, each of which includes a single link. If the predetermined maximum number of links on any sub-requests (T) were 1, the partitioning would stop after the generation of the list of linear topologies shown in column 1. In this case, the partitioning would have identified all linear topologies with only one single link, and the result is a feasible result, since the mappings, having balanced lengths, having lengths less than the maximum threshold value, and having no overlapping links, meets the constraints for the partitioning. This solution, although it satisfies all of the constraints, might not be optimal since the chains are the shortest chains possible, resulting in the highest possible number of feasible linear topologies.

In this example, if K is greater than one, the resource orchestrator attempts to extend each of the linear topologies listed in the first row under the column with the heading K=1 by one additional virtual link and corresponding virtual node. For example, the 0-1 linear topology can be extended to generate one extended linear topology 0-1-3 and another extended linear topology 0-1-4, because the two neighbors of virtual node 1 (as shown in FIG. 10) are virtual nodes 3 and 4. Such extensions may be generated for all of the linear topologies in the K=1 column for which the second node in the linear topology has one or more neighbors. As a result, in the first row under the column with the heading K=2 are listed all possible linear topologies within the mesh topology

TABLE 1

Example partitioning results

| | K = 1 | K = 2 | | K = 3 | | | | K = 4 | |
|---|---|---|---|---|---|---|---|---|---|
| list of all | 0-1 | 0-1-3 | 3-2-0 | 0-1-3-2 | 2-0-1-3 | 4-1-0-2 | 0-1-3-2-4 | 2-3-1-4-5 | 5-3-1-0-2 |
| linear | 0-2 | 0-1-4 | 3-2-4 | 0-1-3-5 | 2-0-1-4 | 4-1-3-2 | 0-1-3-5-4 | 2-3-5-4-1 | 5-3-1-4-2 |
| topologies | 1-0 | 0-2-3 | 3-5-4 | 0-1-4-2 | 2-3-1-0 | 4-1-3-5 | 0-1-4-2-3 | 2-4-1-3-5 | 5-3-2-0-1 |
| for sub- | 1-3 | 0-2-4 | 4-1-0 | 0-1-4-5 | 2-3-1-4 | 4-2-0-1 | 0-1-4-5-3 | 2-4-5-3-1 | 5-3-2-4-1 |
| requests | 1-4 | 1-0-2 | 4-1-3 | 0-2-3-1 | 2-3-5-4 | 4-2-3-1 | 0-2-3-1-4 | 3-1-0-2-4 | 5-4-1-0-2 |
| having K | 2-0 | 1-3-2 | 4-2-0 | 0-2-3-5 | 2-4-1-0 | 4-2-3-5 | 0-2-3-5-4 | 3-1-4-2-0 | 5-4-1-3-2 |
| links | 2-3 | 1-3-5 | 4-2-3 | 0-2-4-1 | 2-4-1-3 | 4-5-3-1 | 0-2-4-1-3 | 3-2-0-1-4 | 5-4-2-0-1 |
| | 2-4 | 1-4-2 | 4-5-3 | 0-2-4-5 | 2-4-5-3 | 4-5-3-2 | 0-2-4-5-3 | 3-2-4-1-0 | 5-4-2-3-1 |
| | 3-1 | 1-4-5 | 5-3-1 | 1-0-2-3 | 3-1-0-2 | 5-3-1-0 | 1-0-2-3-5 | 3-5-4-1-0 | |
| | 3-2 | 2-0-1 | 5-3-2 | 1-0-2-4 | 3-1-4-2 | 5-3-1-4 | 1-0-2-4-5 | 3-5-4-2-0 | |
| | 3-5 | 2-3-1 | 5-4-1 | 1-3-2-0 | 3-1-4-5 | 5-3-2-0 | 1-3-2-4-5 | 4-1-0-2-3 | |
| | 4-1 | 2-3-5 | 5-4-2 | 1-3-2-4 | 3-2-0-1 | 5-3-2-4 | 1-3-5-4-2 | 4-1-3-2-0 | |
| | 4-2 | 2-4-1 | | 1-3-5-4 | 3-2-4-1 | 5-4-1-0 | 1-4-2-3-5 | 4-2-0-1-3 | |
| | 4-5 | 2-4-5 | | 1-4-2-0 | 3-2-4-5 | 5-4-1-3 | 1-4-5-3-2 | 4-2-3-1-0 | |
| | 5-3 | 3-1-0 | | 1-4-2-3 | 3-5-4-1 | 5-4-2-0 | 2-0-1-3-5 | 4-5-3-1-0 | |
| | 5-4 | 3-1-4 | | 1-4-5-3 | 3-5-4-2 | 5-4-2-3 | 2-0-1-4-5 | 4-5-3-2-0 | |
| resulting | same | 0-1-3 | | 0-1-3-2 | | | | 1-3-5-4-2 | |
| set of | as | 0-2-3 | | 0-2-4-1 | | | | 3-2-0-1-4 | |
| linear | above | 1-4-2 | | 3-5-4 | | | | | |
| topologies | | 3-5-4 | | | | | | | |

In Table 1, the first row under each column heading contains a list of all linear topologies having a length equal to K, and the second row under each column heading indicates a resulting set of linear topologies that includes all virtual links but for which there are no overlapping links between the linear topologies. As noted above, the linear topologies shown in Table 1 may be identified using a for virtual network request 1000 that have three virtual nodes connected by two virtual links. Once all of the linear topologies within the mesh topology for virtual network request 1000 that have three virtual nodes connected by two virtual links have been identified, the resource orchestrator may identify one or more sets of linear topologies from among the identified linear topologies under the K=2 and K=1 headings that include all of the virtual links within the mesh topology for virtual network request 1000 but that do not have overlapping links. In this case, a single resulting set of linear topologies shown in row 2 under the K=2 heading includes five linear topologies, each of which includes two links. In some embodiments, the resource orchestrator may identify such sets of linear topologies using a method similar to method 900 illustrated in FIG. 9 and described above.

If K is greater than two, any of the linear topologies listed in the first row under the K=2 heading may be further extended if the third node in the linear topology has one or more additional neighbors. As a result, in the first row under the column with the heading K=3 are listed all possible linear topologies within the mesh topology for virtual network request 1000 that have four virtual nodes connected by three virtual links. Subsequently, the resource orchestrator may identify one or more sets of linear topologies from among the identified linear topologies under the K=3 and K=2 headings that include all of the virtual links within the mesh topology for virtual network request 1000 but that do not have overlapping links. In this case, a single resulting set of linear topologies shown in row 2 under the K=3 heading includes three linear topologies, two of which include three links and one of which includes two links. In some embodiments, the resource orchestrator may identify such sets of linear topologies using a method similar to method 900 illustrated in FIG. 9 and described above.

In this example, any of the linear topologies listed in the first row under the K=3 heading may be further extended if the fourth node in the linear topology has one or more additional neighbors. The results of this last extension are shown in the first row under the column with the heading K=4, in which are listed all possible linear topologies within the mesh topology for virtual network request 1000 that have five virtual nodes connected by four virtual links. Subsequently, the resource orchestrator may identify one or more sets of linear topologies from among the identified linear topologies under the K=4 and K=3 headings that include all of the virtual links within the mesh topology for virtual network request 1000 but that do not have overlapping links. In this case, a single resulting set of linear topologies shown in row 2 under the K=4 heading includes two linear topologies, each of which includes four links. In some embodiments, the resource orchestrator may identify such sets of linear topologies using a method similar to method 900 illustrated in FIG. 9 and described above.

Distributed Chaining

In at least some embodiments of the distributed resource orchestration framework described herein, there may be no global network topology and no global node information available. Instead, each orchestrator may only have access to a partition of a global network topology. In such embodiments, in order to identify one or more candidate solutions for a chaining request, such as an SFC request or a linear-topology sub-request of a virtual network request, a vertex-centric distributed process may be adopted, in which each computation is broken down into iterations, called supersteps. In such embodiments, in each superstep, the compute( ) function of each vertex may be executed once. For example, in some embodiments, upon the arrival of chaining request, a source orchestrator may send the request to all participating orchestrators and may coordinate all orchestrators to execute the compute( ) function in each superstep. During each superstep, these compute functions may be executed substantially in parallel on vertices (nodes) in different domains, but they may synchronize with each other at the end of each superstep. For example, before moving on to the next superstep, the resource orchestrators may ensure that message exchanges for the current superstep have ceased and that all of the vertices received the controller messages that they were supposed to receive from the other vertices over the control channels.

Once a qualified solution to a chaining request is found at a vertex, it may be emitted to the source orchestrator. The distributed computing may halt when there are no further messages exchanged between orchestrators. In some embodiments, after obtaining all qualified chaining solutions from the participating orchestrators, the source orchestrator may select an optimal multi-domain chaining solution for execution based on various user preferences and/or applicable resource usage policies, and may inform the associated orchestrators (e.g., those that manage the resources selected to execute the requested chain) that they should configure the physical nodes within their own domains accordingly (e.g., as needed to perform the various functions of the requested chain). As previously noted, in some embodiments, dependent on various user preferences and/or applicable resource usage policies, the source orchestrator may select two or more of the possible chaining solutions for execution in parallel. In such embodiments, the source orchestrator may inform all of the orchestrators associated with the selected chaining solutions that they should configure the physical nodes within their own domains to perform particular ones of the functions of the chain.

In some embodiments, providing distributed chaining, given a multi-domain network topology (a physical infrastructure topology) that includes vertices (nodes) and edges (links between the nodes), given a set of service functions and the number of compute and/or storage resources available at each vertex, and given the delay and bandwidth at each edge, may include identifying all possible solutions for a chaining request. As previously noted, each chaining request may specify required resources. For example each virtual node in a sub-request of a virtual network request may require a certain number of compute and/or storage resources (e.g., virtual machines) and may require a certain amount of bandwidth (or have an upper limit on delay) for outgoing traffic. In some embodiments, after identifying all feasible mapping solutions for chaining request, the solutions may be pruned according to various policies, requirements, or constraints imposed by a service provider or the requestor of the services. For example, they may be pruned to include only those solutions that have the lowest total cost or the lowest total delay, a subset of solutions that include multiple disjoint chains, those solutions that do (or do not) include bi-directional chains, or that meet multiple different constraints. In some embodiments, the solutions may be pruned by a load balancer that selects a mapping solution based on the current loading on the nodes that are mapped to the various resources required by virtual nodes in the chain. In some embodiments, the computing of a solution (or set of solutions) for a chaining request may be a non-deterministic polynomial-time hard (NP-hard) problem. In some cases, virtual network requests over mesh topologies may be divided into multiple linear-topology sub-requests for mapping to physical nodes, and the results may subsequently be merged back together in order to satisfy these requests.

In at least some embodiment of the present disclosure, a vertex value data structure and a controller message format may be defined for a vertex-centric distributed computing approach for generating chaining solutions in multi-domain networks. Note that such a vertex data structure and message format may be specific for a particular distributed computing problem. Table 2 below illustrates an example vertex value data structure for use in the context of an SFC request or in the context of a linear-topology sub-request of a virtual network request, according to at least one embodiment.

TABLE 2

Vertex Value vertexID (the current vertex ID
{f_i} : a set of network/service functions or applications available at the vertex
a set of resources at the vertex (e.g., VMs, storage, etc.)

In this example, the vertex value data structure includes a vertex identifier, a set of network functions, service functions and/or applications that are available at the vertex, and a set of resources available at the vertex (which may include compute and/or storage resources). In some embodiments, the set of network functions, service functions and/or applications that are available at the vertex may be a subset of the network functions, service functions and/or applications that are supported in the multi-domain network or may be a subset of the network functions, service functions and/or applications that are implemented at the vertex (e.g., if some of the network functions, service functions and/or applications are not currently available for inclusion in requested chaining solution). In at least some embodiments of the present disclosure, if all, or a great many, of the physical nodes and links in a network to which a virtual network request is being mapped include all of the resources needed for all of the virtual nodes in a sub-request of the virtual network request, this may be the worst case scenario from a computation complexity standpoint because there are so many options to check. However, for a typical chaining request, there might be fewer potential solutions because only certain nodes include the resources needed for at least some of the virtual nodes in the chain.

Table 3 below illustrates an example controller message format for use in the context of an SFC request or in the context of a linear-topology sub-request of a virtual network request, according to at least one embodiment.

TABLE 3

Controller Message Format requestID
the current chain

In this example, each message exchanged as part of a vertex-centric distributed computation for identifying solutions to a chaining request in a multi-domain network may include an identifier of the chaining request, and the current chain (which may be a partially mapped chain or a completed chain, in different controller messages).

In at least some embodiments, the vertex-centric distributed processing approach that is applied to identify all possible chaining solutions for a given chaining request may include three major components: the vertex value, the message format, and the compute( ) function, examples of which are shown in Table 2, in Table 3 above, and in the pseudo-code below, respectively. As shown in Table 3, which describes an example of the message format, the current chain may include a sequence of elements of the form <vertexID, nextVertexID, edge info>, each representing a vertex with a particular vertexID that may have been mapped to a corresponding function or virtual node. In these elements, empty brackets (shown as < >) may indicate that the corresponding function or virtual node has not yet been mapped to a vertex. In at least some embodiments, the vertices and their corresponding functions or virtual nodes must maintain the same order in the chain. The nextVertexID indication in each element of the sequence may be used for ordering mapped vertices in the chain.

In some embodiments, the value of the vertexID for a given vertex may be assigned by its local resource orchestrator, and may be unique within its domain. In some embodiments, to distinguish between vertices in different domains, the vertexID may include an identifier of the domain or its resource orchestrator. In other embodiments, within controller messages exchanged between vertices, the vertexID may be augmented with an identifier of the domain or its resource orchestrator. In some embodiments, the value of the chaining request identifier may be assigned by the source resource orchestrator when the chaining request is received or when the source resource orchestrator sends a controller message that includes the chaining request to the other resource orchestrators in the multi-domain network.

One example embodiment of a compute( ) function to be executed at various vertices (nodes) when applying vertex-centric distributed chaining is illustrated by the pseudo-code below. In this example, the compute function performs operations during the first superstep (superstep 0) that are not performed during one or more subsequent supersteps.

```
compute( )
    if (superstep == 0 && vertex.isQualified( )){
        for each neighbor{
            if (edge.isQualified( )){
                generate a chain with the vertex mapped to the function
                    or virtual node; send the chain to the neighbor;}}}
    for each message received{
        if (vertex.isQualified( )) {
            if (all functions/nodes in the chain are mapped) {
                emit the completed chain to the source orchestrator;}
            else {
                for each neighbor{
                    if (edge.isQualified( )){
                        generate the chain with the vertex mapped to the
                            function/node; send the chain to the neighbor;}}}
```

In the example embodiment illustrated above, the compute function may call (or otherwise invoke) a vertex.isQualified( ) method to determine whether or not the particular vertex on which the compute function executes is a qualified vertex. In this example embodiment, for each neighbor vertex of the particular vertex, the compute function may also call (or otherwise invoke) an edge.isQualified( ) method to determine whether or not the link between the particular vertex on which the compute function executes and one of its neighbor vertices is a qualified link. If, for one or more of the neighbor vertices, both of these methods return True, the current vertex may extend the chain (by mapping itself to a service in the chain and including a link to the neighbor vertex) and may send the extended chain to that neighbor vertex in a controller message. In this example, if the vertex.isQualified( ) method returns False, the vertex.isQualified( ) method may not be called for any of the neighbor vertices. In this example, if the vertex.isQualified( ) method returns True, the current chain may be extended and controller messages may be sent only to those neighbor vertices with which the current vertex has a qualified connection (where the edge.isQualified( ) method returns True). In at least some embodiments, if, during superstep 0, no qualifying vertices are found, the distributed computation may stop without returning any feasible solutions. Similarly, if, during a subsequent superstep, none of the partially mapped chains generated by qualified vertices can be completed, the distributed computation may stop without returning any feasible solutions.

In various embodiments, the method vertex.isQualified( ) may call one or more other methods to determine whether or not the particular vertex on which the compute function executes is a qualified vertex. In one example, the method vertex.isQualified( ) may call a method vertex.hasFunction( ), which determines whether or not the current vertex includes functionality that is required to begin, extend, or complete the requested chain. In another example, the method vertex.isQualified( ) may call a method vertex.hasResource( ) that determines whether or not required resource capacity is available on the current vertex (e.g., whether or not required compute and/or storage resources are available at the current vertex). In yet another example, the method vertex.isQualified( ) may call a method vertex.hasVMs( ), which, more specifically, determines whether or not the current vertex includes a required number of VMs for the next element in the chain. Still other methods may be called as part of qualifying the particular vertex on which the compute function executes, in different embodiments. In some embodiments, both a vertex.hasFunction( ) method and another method that determines whether or not required resources are available at the vertex (such as a vertex.hasResource( ) method or a vertex.hasVMs( ) method) may need to return True in order for the vertex.isQualified( ) method to return True.

Similarly, in some embodiments, the method edge.isQualified( ) may call one or more other methods to determine whether or not the link between the particular vertex on which the compute function executes and one of its neighbor vertices is a qualified link. In one example, the method edge.isQualified( ) may call a method edge.hasBW( ), which determines whether or not the link between the particular vertex on which the compute function executes and its neighbor vertex has sufficient bandwidth to extend the chain to the neighbor vertex. In another example, the method edge.isQualified( ) may call a method edge.delayOK( ), which determines whether or not the delay over the link between the particular vertex on which the compute function executes and its neighbor vertex meets delay requirements for extending the chain to the neighbor vertex (e.g., that the link has a delay that is within an acceptable range specified for the requested chain). Still other methods may be called as part of qualifying the link between the particular vertex on which the compute function executes and one of its neighbors, in different embodiments. In some embodiments, the method edge.isQualified( ) may call two or more methods, all of which may need to return True in order for the edge.isQualified( ) method to return True.

Figure 11:
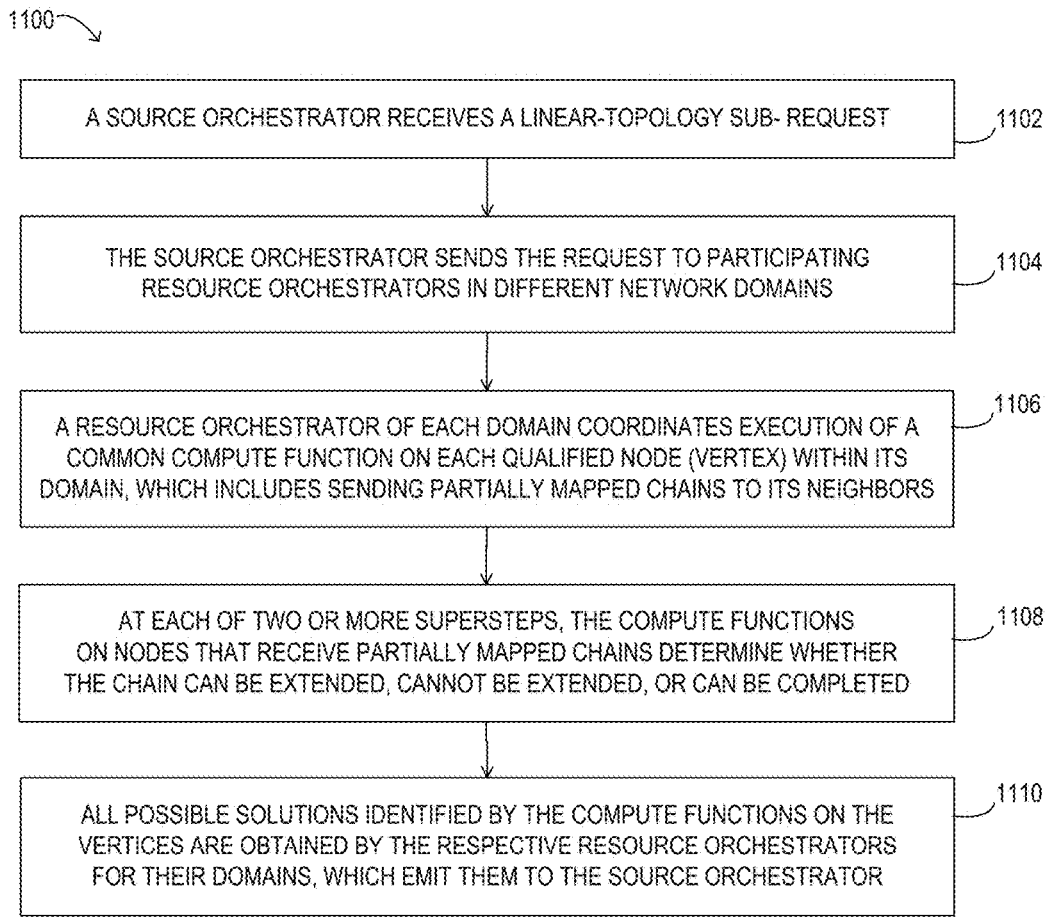
FIG. 11 is a flow diagram illustrating selected elements of a method for performing vertex-centric distributed computing to identify all feasible mappings for a chain of virtual nodes, and corresponding virtual links, in a sub-request of a virtual network request, according to one embodiment.

FIG. 11 is a flow diagram illustrating selected elements of a method 1100 for performing vertex-centric distributed computing to identify all feasible mappings for a chain of virtual nodes, and corresponding virtual links, in a sub-request of a virtual network request over a mesh topology in a network, according to one embodiment. In some embodiments, the network may be a multi-domain network. In this example embodiment, the method includes (at 1102) a source orchestrator receiving one such linear-topology sub-request. The method includes (at 1104) the source orchestrator sending the request to participating resource orchestrators in different network domains.

In this example, the method includes (at 1106) the resource orchestrators of each domain coordinating the execution of a common compute function on each qualified node (vertex) its domain (e.g., on each physical node that includes the required resources for the first virtual node in the sub-request). This may include the qualified nodes sending partially mapped chains to their neighbor nodes. The method includes (at 1108), at each of two or more supersteps, the compute function on these and other nodes that receive a partially mapped chain determining whether the chain can be extended, cannot be extended, or can be completed. The method also includes (at 1110) all possible solutions identified by the compute functions on the vertices being obtained by the respective resource orchestrators for their domains, which emit them to the source orchestrator.

In some embodiments, an objective of the vertex-centric distributed approach described herein is to identify all qualified mapping solutions for a sub-request of virtual network request over a mesh topology. In some embodiments, the results of this computation may be pruned to identify only those solutions that meet other criteria, according to policies of the service provider and/or requestor preferences. For example, in some embodiments, the potential solutions may be pruned to include only those potential solutions having a total cost that is below a specified total cost threshold or having a total delay that is below a specified total delay threshold. The total cost of a solution may be specified in terms of real costs (e.g., fiber costs or the cost of physical links) or in terms of bandwidth or delay, in different embodiments. In some embodiments, the potential solutions may be pruned to include only those potential solutions that meet multiple such constraints (e.g., constraints on two or more of: cost, delay, and/or bandwidth). In some embodiments, the selection of one or more of the potential solutions may be determined at runtime by a load balancer. In some embodiments, for protection purposes, the potential solutions may be pruned to include a set of potential solutions that include disjoint chains. For example, if the chains in the pruned set of potential solutions do not include any overlapping resources (e.g., no overlapping physical links or physical nodes), and if one of the resources in a selected chain in the set becomes unavailable, it will not affect the availability of the other chains in the pruned set of potential solutions.

Figure 12:
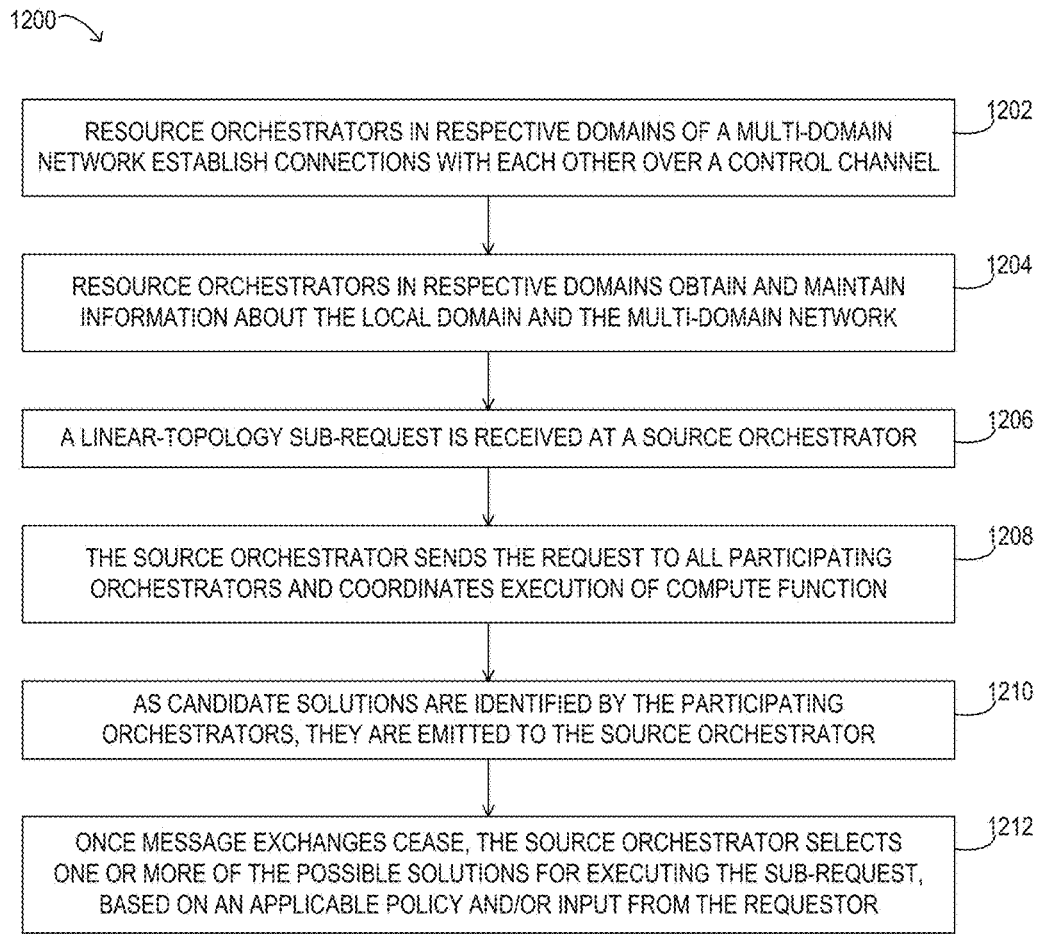
FIG. 12 is a flow diagram illustrating selected elements of a method for satisfying a linear-topology sub-request of a virtual network request, according to one embodiment.

FIG. 12 is a flow diagram illustrating selected elements of a method 1200 for satisfying a linear-topology sub-request of a virtual network request, according to one embodiment. In this example embodiment, the method includes (at 1202) the resource orchestrators in respective domains of a multi-domain network establishing connections with each other over a control channel. The method includes (at 1204) the resource orchestrators in the respective domains obtaining and maintaining information about their local domains and about the multi-domain network. For example, in some embodiments, the resource orchestrators may store this information in memory on the nodes on which they reside (e.g., in vertex value data structures, edge data structures, and/or other data structures). While coordinating a vertex-centric distributed computation to identify all qualified solutions for the linear-topology sub-request in a multi-domain network, the local resource orchestrators may also maintain (e.g., in memory) information representing the virtual network requests or sub-requests thereof, SFC requests, partially mapped service function chains, completed service function chains, or other information usable in computing solutions for various virtual network requests (or linear-topology sub-requests thereof) or SFC requests, in different embodiments.

In this example embodiment, the method includes (at 1206) receiving a linear-topology sub-request at a source orchestrator. The method also includes (at 1208) the source orchestrator sending the linear-topology sub-request to all participating orchestrators in the multi-domain network and coordinating the execution of a common compute function, as described herein. As candidate solutions are identified by the participating orchestrators (at 1210), the method includes emitting them to the source orchestrator. Once (at 1212) the message exchanges cease, the method includes the source orchestrator selecting one or more of the possible solutions for executing the linear-topology sub-request, based on an applicable policy and/or input from the requestor.

Figure 13:
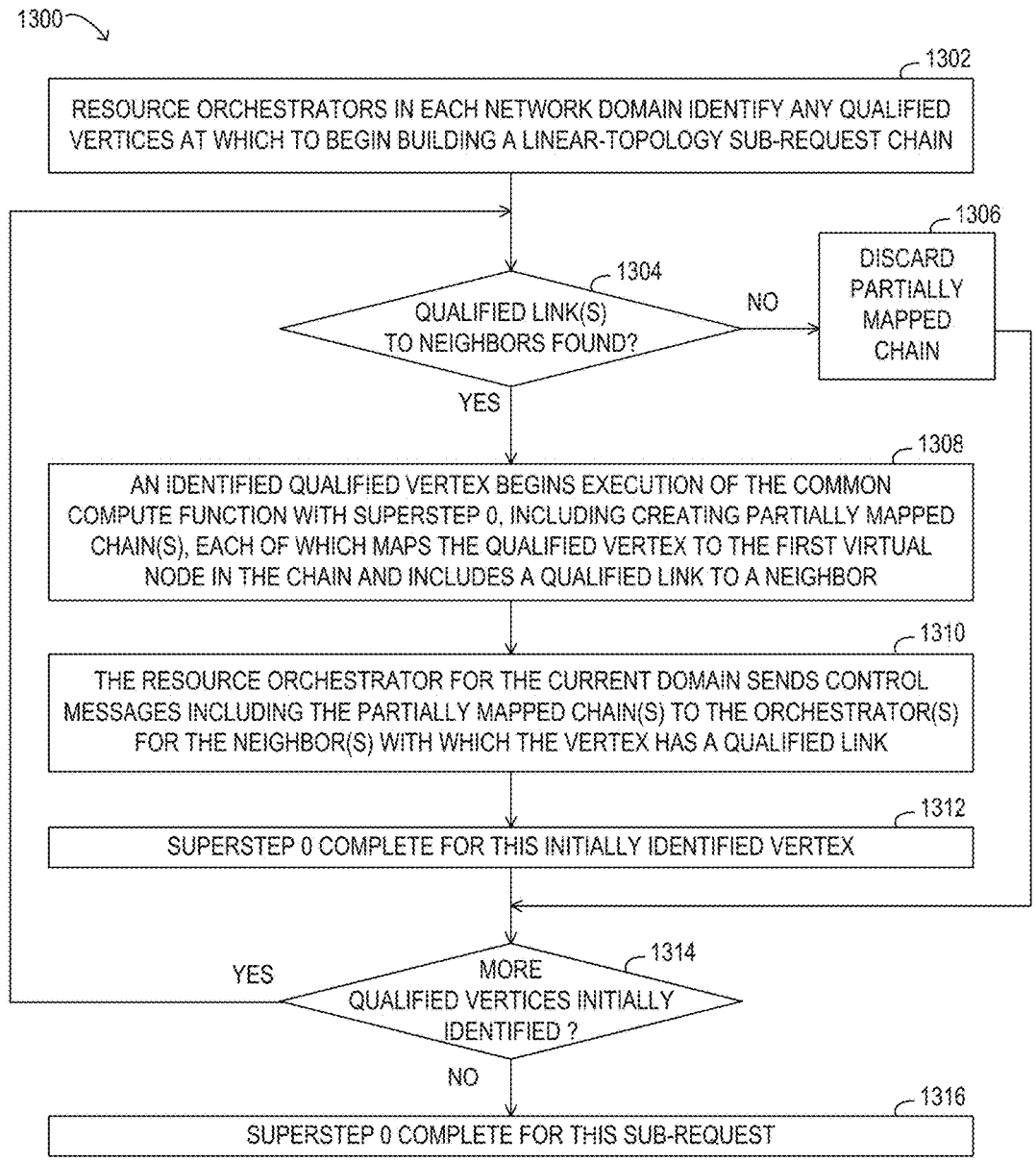
FIGS. 13 and 14 illustrate selected elements of an example method for performing a compute( ) function, according to one embodiment.
Figure 14:
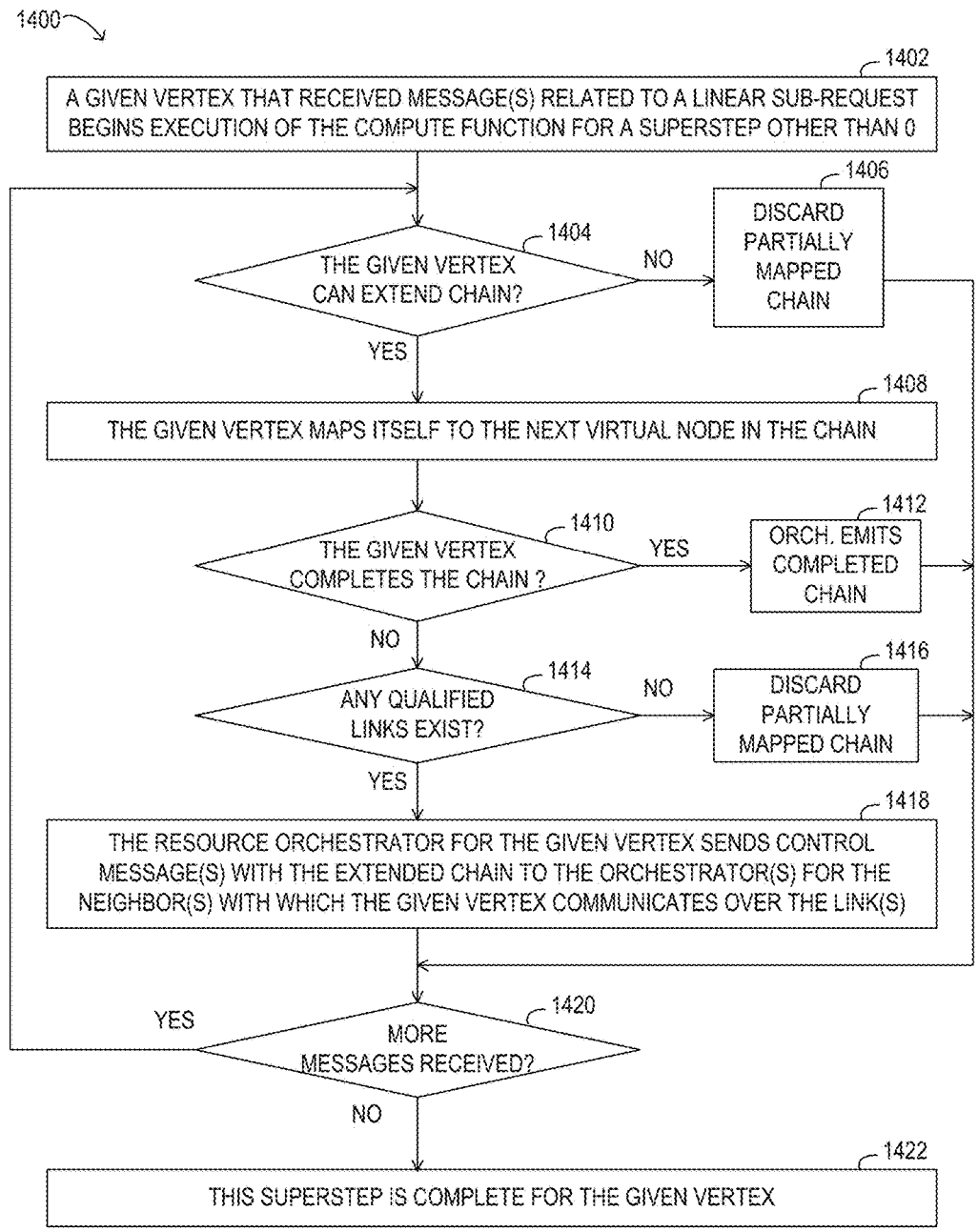

FIGS. 13 and 14 illustrate selected elements of an example method for performing a compute( ) function, such as that described above. More specifically, FIG. 13 illustrates selected elements of a method 1300 for performing superstep 0 of the compute function, according to one embodiment. In this example embodiment, during superstep 0, each qualified vertex sends a message to each potentially qualified neighbor (neighbors that have qualified links to the qualified vertex and that may also include the required resources for the next virtual node in a linear-topology sub-request chain). In this example embodiment, the method includes (at 1302) the resource orchestrators in each network domain identifying any qualified vertices (each of which corresponds to a physical node) at which to begin building a given linear-topology sub-request chain. For example, a source resource orchestrator in one domain may send a controller message that includes a linear-topology sub-request chain to the respective resource orchestrators for one or more other domains, each of which may identify any vertices (physical nodes) in its domain that include the required resources for the first virtual node in the linear-topology sub-request chain. Each vertex that is identified as a qualified vertex may be mapped to the first virtual node in a respective partially mapped chain.

In this example embodiment, the method includes (at 1304), determining whether there are any qualified links between the given vertex and its neighbors (e.g., links in the physical infrastructure that meet bandwidth and/or delay requirements for the linear-topology sub-request chain). If not, the method includes discarding the partially mapped chain that includes the identified qualified vertex (as in 1306). If (at 1304) one or more qualified links between the given vertex and its neighbors is found, the method includes (at 1308) one of the identified qualified vertices beginning execution of the common compute function with superstep 0, including, for any qualified links from the qualified vertex to a neighbor, creating a partially mapped chain that maps the qualified vertex to the first virtual node in the chain and includes the qualified link to the neighbor. In some embodiments, when a neighbor with a qualified link is in a different domain than the qualified vertex, the method also includes (at 1310) the resource orchestrator for the current domain sending a control message that includes the partially mapped chain(s) to the orchestrator(s) for the neighbor(s) with which the vertex has a qualified link, after which superstep 0 is complete for this initially identified qualified vertex (as in 1312). In some embodiments in which a neighbor with a qualified link is in the same domain as the qualified vertex, the domain controller may not send a control message to any other orchestrator, but may handle the next superstep for that neighbor itself. In other embodiments in which a neighbor with a qualified link is in the same domain as the qualified vertex, messages may be exchanged between the two vertices through writes to and reads from a memory.

In this example embodiment, if (as shown in 1314) there were more qualified vertices initially identified (at step 1302), the operations shown in 1304-1312 may be repeated, as appropriate, for each additional one of the initially qualified vertices. If, or once (at 1314), there are no more qualified vertices that were initially identified to process, superstep 0 may be complete for this linear-topology sub-request chain (as in 1316). Note that while FIG. 13 illustrates an embodiment in which the operations shown in 1304-1312 are performed for each initially identified qualified vertex in series, in at least some embodiments of the present disclosure, these operations may be performed substantially in parallel for some or all of the initially identified qualified vertices.

FIG. 14 illustrates selected elements of a method 1400 for performing supersteps of the compute function described above other than superstep 0, according to one embodiment. More specifically, FIG. 14 illustrates the actions taken on one vertex (physical node) that receives a controller message including a partially mapped chain for a linear-topology sub-request, and that may or may not be able to be extended or completed on the given vertex, depending on whether it includes required resources for the next virtual node in the linear-topology sub-request. In this example embodiment, the method includes (at 1402) a given vertex that received one or more such controller messages beginning execution of the compute function for a superstep other than superstep 0 (e.g., for the superstep following the superstep in which the controller message was sent to the given vertex). The method includes (at 1404) determining whether the received controller message includes a partially mapped chain for a linear-topology sub-request that can be extended (or completed) at the given vertex. If it is determined that the received controller message includes a partially mapped chain for a linear-topology sub-request that cannot be extended (much less completed) at the given vertex, the method includes discarding the partially mapped chain that was included in the received message (as in 1406).

If (at 1404) it is determined that the received controller message includes a partially mapped chain for a linear-topology sub-request that can be extended at the given vertex, the method includes (at 1408) the given vertex mapping itself to the next virtual node in the linear-topology sub-request chain. The method also includes (at 1410) determining whether or not the mapping of the given vertex to the next virtual node in the chain completes the linear-topology sub-request chain. If so, the mapping is completed for this candidate solution, and the method includes the orchestrator for the domain in which the given vertex resides emitting the completed chain to the source resource orchestrator (as in 1412).

If (at 1410) it is determined that the partially mapped chain in the received controller message is not completed by mapping of the given vertex to the next virtual node in the linear-topology sub-request chain, the method may include continuing the attempt to identify a potential candidate solution for the linear-topology sub-request chain. In the example embodiment illustrated in FIG. 14, this includes (at 1414) determining whether or not there are any qualified links between the given vertex and its neighbors (e.g., links in the physical infrastructure that meet bandwidth and/or delay requirements for the linear-topology sub-request chain). If not, the method includes discarding the partially mapped chain that includes the identified qualified vertex (as in 1416). If (at 1414) one or more qualified links between the given vertex and its neighbors is found (and if any of the neighbors with qualified links are in a different domain than the given vertex), the method includes the resource orchestrator for the given vertex sending a respective control message with the extended chain to the orchestrator for each of the neighbor(s) in other domains with which the given vertex communicates over the qualified link(s). In some embodiments in which a neighbor with a qualified link is in the same domain as the given vertex, the domain controller may not send a control message to any other orchestrator, but may handle the next superstep for that neighbor itself. In other embodiments in which a neighbor with a qualified link is in the same domain as the given vertex, messages may be exchanged between the two vertices through writes to and reads from a memory.

If (as shown at 1420) more controller messages related to the linear-topology sub-request chain were received by the given vertex, the operations shown in elements 1404-1418 may be repeated, as appropriate, for each additional message that was received. If, or once (at 1420), there are no additional received messages to process, this superstep is complete for the given vertex (as shown in 1422).

In the example embodiment described above, during each superstep other than superstep 0, the operations shown in FIG. 14 are repeated for each vertex that received a controller message from a resource orchestrator in the previous superstep. In at least some embodiments, during each superstep, the operations shown in FIG. 14 may be performed substantially in parallel for two or more vertices that received a controller message from a resource orchestrator in the previous superstep. In some embodiments, the total number of supersteps performed by the compute function in response to a linear-topology sub-request chain may be equal to number of virtual nodes included in the linear-topology sub-request chain.

In the example illustrated in FIGS. 13 and 14, during superstep 0, the compute function is executed to identify any vertices (physical nodes) on which required resources for the first virtual node in a linear-topology sub-request chain are available and to send a partially mapped chain to its neighbor vertices (physical nodes) with which it has qualifying links. During superstep 1, the compute function is executed to identify any of those neighbor vertices (nodes) on which required resources for the second virtual node in the linear-topology sub-request chain are available and to send an extended partially mapped chain to their neighbors (i.e., to the neighbors of the neighbors), if there are qualifying links to those neighbor vertices (physical nodes). During superstep 2, the compute function is executed to determine whether the neighbors of the neighbors can complete the chain by adding a mapping for the third virtual node in the linear-topology sub-request chain, and to return any completed chains to the source resource requestor. This example shows that, in at least some embodiments, the number of supersteps will be equal to the number of virtual nodes in the linear-topology sub-request chain, illustrating the scalability of this approach.

In some embodiments, messages exchanged between a pair of resource orchestrators at a particular superstep may be combined. However, in at least some embodiments, the physical nodes may not communicate with each other during distributed computing (e.g., when performing the functions of an SFC or of another type of distributed operation or computation).

The distributed chaining approach described above may be further illustrated in reference to virtual network request 1000 shown in FIG. 10. For example, a master resource orchestrator that partitioned virtual network request 1000 into two linear-topology sub-requests may send the first sub-request $L_0$ (which includes a subset of the virtual nodes and corresponding virtual links of the mesh topology for virtual network request 1000) to resource orchestrators in one or more other domains of a multi-domain network. The respective orchestrator in each of one or more of the domains may identify a vertex (e.g., a physical node A) on which required resources for the first virtual node in the first linear-topology sub-request $L_0$ (virtual node 1) are available. If there are no qualified links from node A to any of its neighbors found (e.g., no physical links that meet resource requirements for the link between the first and second virtual nodes in the linear-topology sub-request), the attempt to build the linear-topology sub-request beginning at node A may be abandoned. On the other hand, if there are qualified links from node A to one or more neighbors found, node A may begin executing the common compute function with superstep 0, creating a first partially mapped chain in which virtual node 1 is mapped to node A, and sending control messages including the partially mapped chain to the orchestrators for the neighbors with which node A has a qualified link. Similarly, if required resources for the first virtual node in the first linear-topology sub-request $L_0$ (virtual node 1) are available on a physical node H and if there are qualified links from node H to any of its neighbors found, physical node H may also begin executing the common compute function with superstep 0, creating a second partially mapped chain in which virtual node 1 is mapped to node H, and sending control messages including the partially mapped chain to the orchestrators for the neighbors with which node H has a qualified link.

Subsequently, one of the neighbors of node A (e.g., physical node B) that received the first partially mapped chain may begin execution of the common compute function for superstep 1, including determining whether the partially mapped chain for linear-topology sub-request $L_0$ can be extended on node B (e.g., determining whether or not required resources for the second virtual node, virtual node 3, are available on physical node B). If so, node B may map itself to virtual node 3 and, assuming there are qualified links from node B to one or more of its neighbors, node B may send control messages including the first partially mapped chain to the orchestrators for the neighbors with which node B has a qualified link. Similarly, a node I that received the second partially mapped chain from node H may extend the chain, mapping itself to virtual node 3.

In superstep 2, a physical node C that received the first partially mapped chain from node B may extend the chain, mapping itself to virtual node 5, and a node J that received the second partially mapped chain from node I may extend the chain, mapping itself to virtual node 5. In superstep 3, a physical node D that received the first partially mapped chain from node C may extend the chain, mapping itself to virtual node 4, and a node K that received the second partially mapped chain from node J may extend the chain, mapping itself to virtual node 4. Finally, in superstep 4, a physical node E that received the first partially mapped chain from node D may complete the first chain by mapping itself to virtual node 2, and a node L that received the second partially mapped chain from node K may complete the chain by mapping itself to virtual node 2. In this way, two feasible mappings for linear-topology sub-request $L_0$ may be identified.

A similar approach may be taken to construct one or more feasible mappings for the virtual nodes 3, 2, 0, 1, and 4 of the second linear-topology sub-request $L_1$, (in that order) to respective physical nodes. For example, a first chain may map virtual node 3 to physical node B, virtual node 2 to physical node E, virtual node 0 to physical node F, virtual node 1 to physical node A, and virtual node 4 to physical node D. A second chain may map node 3 to physical node M, virtual node 2 to physical node N, virtual node 0 to physical node O, virtual node 1 to physical node P, and virtual node 4 to physical node Q. In this way, two feasible mappings for linear-topology sub-request $L_1$ may be identified.

In some embodiments, after one or more feasible mappings are identified for each sub-request of a virtual network request, a master resource orchestrator may combine one of the mappings for each sub-request to generate a solution for the virtual network request. In one example embodiment, the resource orchestrator may remove the feasible mappings for a given sub-request in which a physical node that is mapped to a given virtual node is not included in the set of physical nodes formed by the intersection of the physical nodes to which the given virtual node is mapped in the given sub-request and one or more other sub-requests. The remaining feasible mappings, any of which may include mappings for some non-overlapping virtual nodes within the mesh topology for the virtual network request, may be combined to generate the final result.

Figure 15:
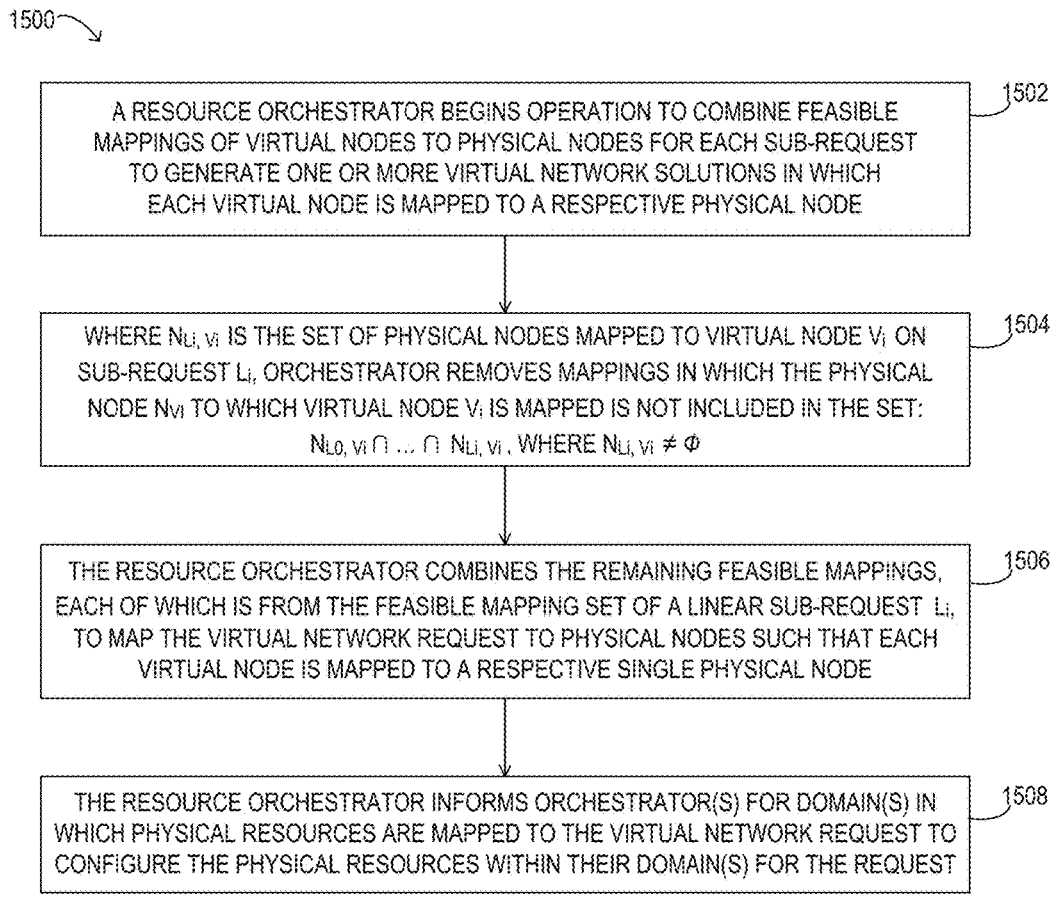
FIG. 15 is a flow diagram illustrating selected elements of a method for combining feasible mapping solutions for each of multiple linear-topology sub-requests into which a virtual network request over a mesh topology has been partitioned, according to one embodiment.

FIG. 15 is a flow diagram illustrating selected elements of a method 1500 for combining feasible mapping solutions for each of multiple linear-topology sub-requests into which a virtual network request over a mesh topology has been partitioned, according to one embodiment. In some embodiments, method 1500 may be performed by a master resource orchestrator on one of the physical nodes in a network of physical nodes to which the virtual network request is being mapped. In some embodiments, the network may be a multi-domain network.

In this example, method 1500 includes (at 1502) a resource orchestrator beginning an operation to combine feasible mappings of virtual nodes to physical nodes for each sub-request to generate one or more virtual network solutions in which each virtual node is mapped to a respective physical node. In this example embodiment, (at 1504), where $N_{Li, \, Vi}$ is the set of physical nodes mapped to virtual node $V_i$ on sub-request $L_j$, method 1500 includes the resource orchestrator removing any mappings in which the physical node $N_{Vi}$ to which virtual node $V_i$ is mapped is not included in the set:

$$N_{Li,Vi} \cap \ldots \cap N_{Li,Vi}, \text{ where } N_{Li,Vi} \neq \Phi$$

Method 1500 also includes (at 1506) the resource orchestrator combining the remaining feasible mappings, each of which is selected from the feasible mapping set of a linear sub-request $L_j$, to map the virtual network request to physical nodes such that each virtual node is mapped to a respective single physical node. At 1508, method 1500 includes the resource orchestrator informing orchestrator(s) for domain(s) in which physical resources are mapped to the virtual network request to configure the physical resources within their domain(s) for the request.

Referring again to the virtual network request 1000 illustrated in FIG. 10, and the results of the partitioning of virtual network request 1000 shown in Table 1 above, virtual network request 1000 can be partitioned into two sub-requests, each of with a linear topology that includes five virtual nodes connected by four virtual links. For example, virtual network request 1000 may be partitioned into a linear topology $L_0$ containing a chain of virtual nodes 1-3-5-4-2 (as one sub-request) and another linear topology $L_1$ containing a chain of virtual nodes 3-2-0-1-4 (as another sub-request).

If, as described above, two feasible mappings are identified for sub-request $L_0$, and two feasible mappings are identified for sub-request $L_0$, a master resource orchestrator may further reduce the feasible mappings to filter out unsatisfied physical mappings before combining them into potential solutions for the virtual network request. For example, for the first sub-request $L_0$=1-3-5-4-2, the identified feasible mappings are {A-B-C-D-E, H-I-J-K-L}. For the second sub-request $L_1$=3-2-0-1-4, the identified feasible mappings are {B-E-F-A-D, M-N-O-P-Q}. In this example, the mapping H-I-J-K-L for $L_0$ may be discarded because physical node H (to which virtual node 1 is mapped) does not appear in the set formed by intersection of the set of nodes mapped to virtual node 1 by the feasible mappings of $L_0$ and the set of nodes mapped to virtual node 1 by the feasible mappings of $L_1$, which includes only node A. Similarly, only node B appears in the set formed by intersection of the set of nodes mapped to virtual node 3 by the feasible mappings of $L_0$ and the set of nodes mapped to virtual node 3 by the feasible mappings of $L_1$, only node D appears in the set formed by intersection of the set of nodes mapped to virtual node 4 by the feasible mappings of $L_0$ and the set of nodes mapped to virtual node 4 by the feasible mappings of $L_1$. Since virtual node 5 appears only in L0 and virtual node 0 appears only in L1, the nodes to which they are mapped for their respective sub-requests cannot disqualify any of the feasible mappings for the other sub-request.

In addition, the mapping M-N-O-P-Q for $L_1$ may be discarded because physical node M (to which virtual node 3 is mapped) does not appear in the set formed by intersection of the set of nodes mapped to virtual node 3 by the feasible mappings of $L_0$ and the set of nodes mapped to virtual node 3 by the feasible mappings of $L_1$ (which includes only node B), physical node N (to which virtual node 2 is mapped) does not appear in the set formed by intersection of the set of nodes mapped to virtual node 2 by the feasible mappings of $L_0$ and the set of nodes mapped to virtual node 2 by the feasible mappings of $L_1$ (which includes only node E), physical node P (to which virtual node 1 is mapped) does not appear in the set formed by intersection of the set of nodes mapped to virtual node 1 by the feasible mappings of $L_0$ and the set of nodes mapped to virtual node 1 by the feasible mappings of $L_1$ (which includes only node A), and physical node Q (to which virtual node 4 is mapped) does not appear in the set formed by intersection of the set of nodes mapped to virtual node 4 by the feasible mappings of $L_0$ and the set of nodes mapped to virtual node 4 by the feasible mappings of $L_1$ (which includes only node D). Therefore, in this example, the only remaining feasible mappings are {A-B-C-D-E} for $L_0$ and {B-E-F-A-D} for $L_1$.

Figure 16:
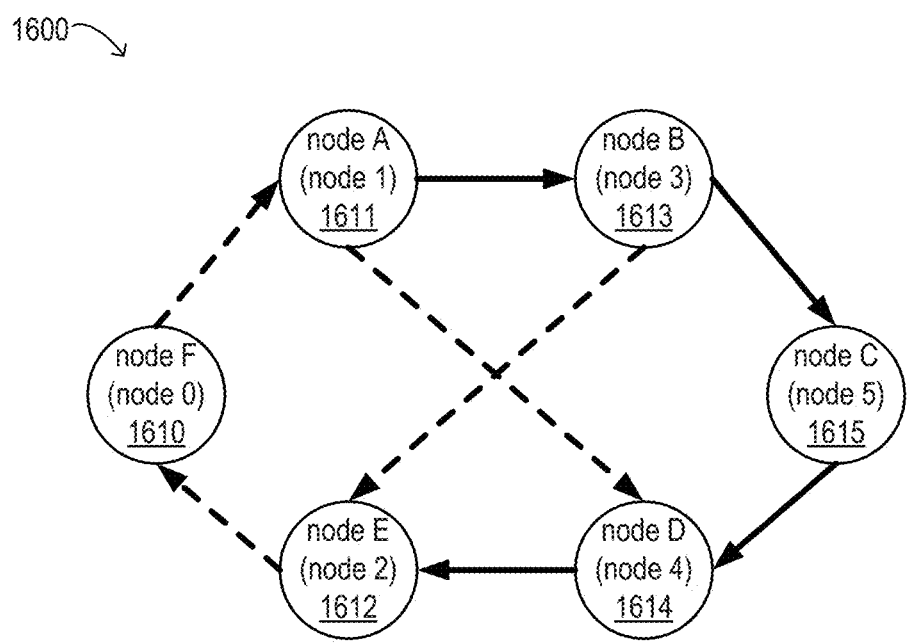
FIG. 16 illustrates results of an operation to combine feasible mapping solutions for each of the linear-topology sub-requests into which the example virtual network request illustrated in FIG. 10 has been partitioned, according to one embodiment.

The result of the combining operation is illustrated in FIG. 16. In this example, a linear topology $L_0$ containing a chain of virtual nodes 1-3-5-4-2 (corresponding to the first sub-request) is shown by the solid arrows connecting physical nodes A (1611), B (1613), C (1615), D (1614), and E (1612) to each other, in that order. Another linear topology $L_1$ containing a chain of virtual nodes 3-2-0-1-4 (corresponding to the second sub-request) is shown by the dashed arrows connecting physical nodes B (1613), E (1612), F (1610), A (1611), and D (1614), in that order. In this example, while physical nodes A (1611), B (1613), D (1614), and E (1612) are included in both linear topologies, there are no physical links that are common to the two linear topologies (i.e., no overlapping links). In this example, node C (1615) is only found in linear topology $L_0$, and node F (1610) is only found in linear topology $L_1$.

In some embodiments, if more than one feasible mapping remains for one or more of the sub-requests following a pruning operation such as that described above, there may be multiple feasible solutions for the virtual network request. In this case, the number of feasible physical mappings would be equal to the product of the number of remaining feasible mappings for each of the sub-requests. For example, if two feasible mappings remained for sub-request $L_0$ and only one feasible mapping remained for sub-request $L_1$, there would be two possible combinations of these feasible mappings, thus two possible solutions for the virtual network request. In some embodiments, the selection of a solution from among multiple possible solutions may be made randomly by the orchestrator that combines them. In other embodiments, the selection of a solution from among multiple possible solutions may be dependent on the relative locations of the physical resources in different solutions, the relative costs of the physical resources in different solutions, relative delays associated with different solutions, the relative positions within the network at which physical nodes are mapped to particular virtual nodes in different solutions, or on any other suitable criteria.

Figure 17:
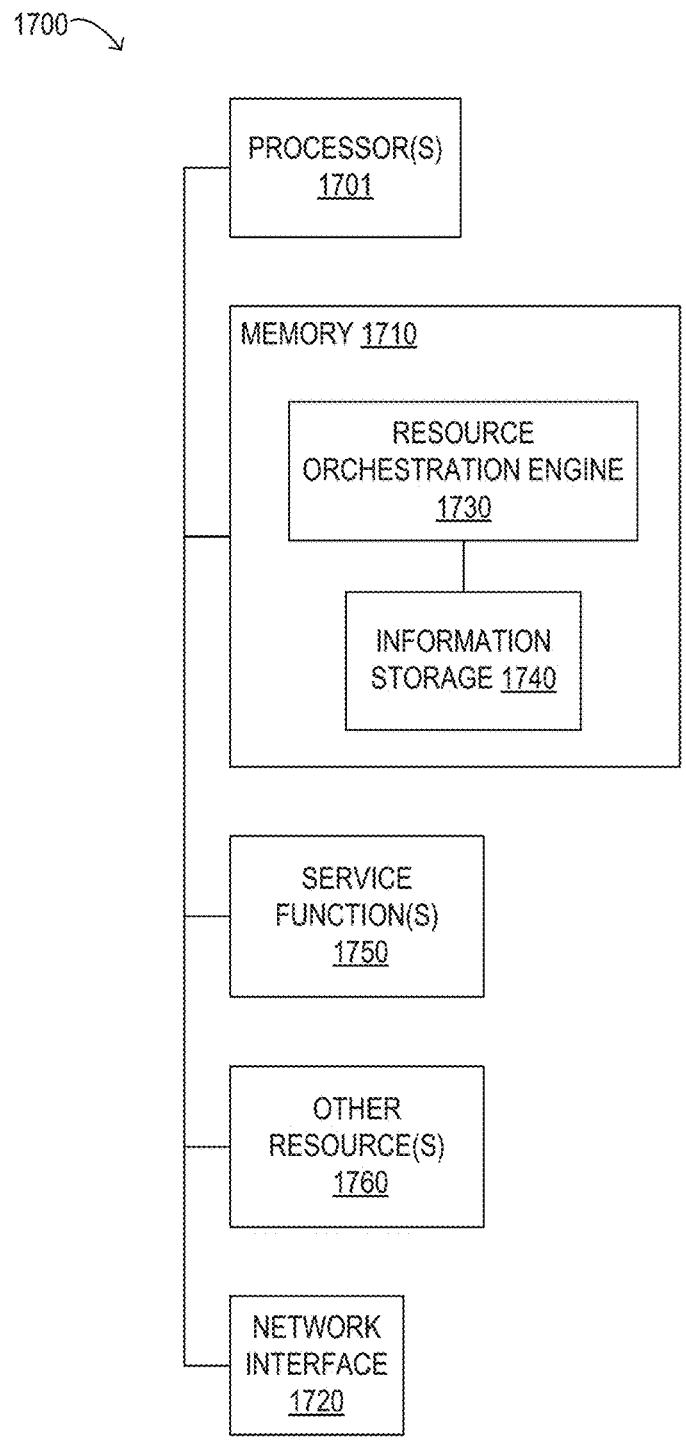
FIG. 17 is a block diagram of selected elements of an example network element, according to at least some embodiments.

Referring now to FIG. 17, a block diagram of selected elements of an example network element 1700 is illustrated, according to at least some embodiments. In FIG. 17, network element 1700 is represented as a computer system including physical and logical components for implementing any of the network elements in a multi-domain network. In various embodiments, a network element similar to network element 1700 may implement any of the network elements 172 illustrated in FIG. 1, any of the network elements illustrated in FIG. 2, any of the domain-specific resource orchestrators described herein (such as any of the resource orchestrators 108 illustrated in FIGS. 1, 3 and 4), any of the vertices (physical nodes) described herein, or a network controller (such as an SDN controller for a particular domain in a multi-domain network), as described herein. However, some of these network elements may not include all of the components illustrated in FIG. 17, in some embodiments. In other embodiments, any of the network elements described herein may include more, fewer, or different components than those included in the example embodiment illustrated in FIG. 17.

As illustrated in this example, network element 1700 may, accordingly, include one or more processors 1701, memory 1710, one or more service functions 1750 or other resources 1760 that are required for a given virtual network request, and a network interface 1720. Processor 1701 may represent one or more individual processing units and may execute program instructions, interpret data, and process data stored by memory 1710 or another component within network element 1700 to implement the functionality of any of the network elements described herein, in different embodiments. In this example embodiment, each service function 1750 may include circuitry, logic, and/or program instructions for implementing any of a variety of service functions that may be included in a virtual network request or service function chain request including, but not limited to, those described herein. Similarly, each other resource 1760 may include circuitry, logic, and/or program instructions for implementing any of a variety of other resources that may be required to satisfy a virtual network request or service function chain including, but not limited to, those described herein.

In FIG. 17, memory 1710 may be communicatively coupled to processor 1701 and may comprise a system, device, or apparatus suitable to retain program instructions and data for a period of time (e.g., non-transitory computer-readable media). Memory 1710 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 1710 may include different numbers of physical storage devices, in various embodiments.

As shown in FIG. 17, memory 1710 may include instructions to implement functionality of resource orchestration engine 1730. Resource orchestration engine 1730, in collaboration with other instances of resource orchestration engine 1730 on other instances of network element 1700, may implement distributed network embedding for identifying one or more solutions for a virtual network request and/or vertex-centric distributed computing for identifying all qualified solutions for an SFC request or a linear sub-request of a virtual network request in a multi-domain network. In various embodiments, resource orchestration engine 1730, alone or in collaboration with other instances of resource orchestration engine 1730 on other instances of network element 1700, may implement any of the elements of method 700 illustrated in FIG. 7, method 800 illustrated in FIG. 8, method 900 illustrated in FIG. 9, method 1100 illustrated in FIG. 11, method 1200 illustrated in FIG. 12, method 1300 illustrated in FIG. 13, method 1400 illustrated in FIG. 14, and/or method 1500 illustrated in FIG. 15, among other functionality described in the present disclosure. Memory 1710 may also include information storage 1740, which may store information usable by resource orchestration engine 1730 including, but not limited to, data representing a virtual network request, a linear sub-request of a virtual network request having a mesh topology, an SFC request, node information (including data indicating the available compute and/or storage resources and/or service functions), edge information (e.g., in one or more edge data structures), vertex information (e.g., in one or more vertex value data structures), data representing one or more partially mapped service function chains or chains representing a linear sub-request of a virtual node request having a mesh topology, data representing one or more candidate solutions for a service function chain request or a linear sub-request (e.g., data representing a completed service function chain or a completed chain for a linear sub-request), data representing user resource usage preferences and policies, data representing inputs or outputs of a service function 1750, data representing inputs or outputs for other resources 1760, or values of any default or configurable parameters used to implement the functionality described herein or any other functionality of network element 1700.

While many of the example embodiments described herein are directed to the application of vertex-centric distributed computing for identifying all qualified solutions for an SFC request or a sub-request of a virtual network request in a distributed multi-domain network, in other embodiments, this approach may be applied in a centralized system. For example, in a centralized system, a single resource orchestrator may include all of the node and link information for the whole multi-domain network, and the network may not be partitioned. In this example, the single resource orchestrator may coordinate the execution of a common compute function on appropriate ones of the vertices (nodes) in a series of supersteps to build up any potential solutions for an SFC request a sub-request of a virtual network request. In other words, in a centralized system, a single resource orchestrator may implement the functionality of all of the respective resource orchestrators in the distributed systems described above. In some embodiments of such a centralized system, rather than exchanging controller messages between vertices (nodes) over control channels, messages that include partially mapped chains may be exchanged between vertices (nodes) by writing then to and reading them from memory. As in the case of the distributed systems described above, once the single resource orchestrator has identified all feasible chains for satisfying an SFC request or a sub-request of a virtual network request, the single resource orchestrator may present them to another process that decides, based on one or more policies or constraints, which one or more of the identified chains to implement.

In at least some embodiments of the systems described herein, a vertex-centric approach to computing all feasible chaining solutions in a multi-domain network may have advantages over earlier approaches. In different embodiments, the vertex-centric framework and resource orchestration approach described herein may be suitable for both centralized and distributed settings. It may avoid the issues associated with the replication of global state information in traditional architectures, and has been shown to be more efficient than earlier approaches in terms of signaling delay and the number of messages exchanged. In at least some embodiments, this approach may be highly scalable for computing all feasible mapping solutions for SFC requests in multi-domain networks. For example, the systems and methods described herein may, in some embodiments, be used to coordinate and control resources implemented on the 1Finity™ platform from Fujitsu Network Communications Inc. that cover access, metro, core, and datacenter networks.

In at least some embodiments of the present disclosure, a mapping solution for a virtual network request may be generated, using a resource orchestration framework, by partitioning the virtual network into multiple non-overlapping linear-topology sub-requests, applying a vertex-centric distributed computing approach to identify feasible mappings for each sub-request independently, and then combining one feasible mapping for each sub-request. A resource orchestrator may partition the virtual network request into a minimum set of balanced linear topologies in which there are no overlapping links. This approach may be applied to perform distributed virtual network embedding in both distributed and centralized system, in different embodiments, and is suitable for application in large-scale networks. In general, in at least some embodiments of the present disclosure, the systems and methods described herein may be used to solve large-scale, multi-domain, multi-layer network problems spanning service functions, virtual machines, data centers, switching systems, and the Internet of Things.

While the subject of this specification has been described in connection with one or more example embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for distributed virtual network embedding, comprising:
   receiving, at a resource orchestrator, a virtual network request specifying:
      a set of virtual nodes;
      a set of virtual links, each of which connects two of the virtual nodes in a mesh topology for the virtual network request; and
      a resource requirement for at least one of the virtual nodes;
   generating, by the resource orchestrator, a mapping solution for the virtual network request in which each virtual node in the set of virtual nodes is mapped to a respective one of a plurality of physical nodes, each physical node being represented as a vertex in a resource orchestration framework, wherein generating the mapping solution comprises:
      partitioning, by the resource orchestrator, the virtual network request into a plurality of sub-requests, wherein each sub-request specifies a linear topology for a subset of the virtual nodes and virtual links within the mesh topology for the virtual network request, and the plurality of sub-requests collectively include all virtual links within the mesh topology for the virtual network request;
      computing, independently for each sub-request, a respective chaining solution in which each virtual node in the subset of virtual nodes for which a linear topology is specified for the sub-request is mapped to a physical node on which resources sufficient for implementing the virtual node are available; and
      combining, by the resource orchestrator, the respective chaining solutions for each of the sub-requests.

2. The method of claim 1, wherein partitioning the virtual network request into a plurality of sub-requests comprises identifying all linear topologies within the mesh topology for the virtual network request in which the number of links is less than or equal to a predetermined maximum number of links.

3. The method of claim 1, wherein partitioning the virtual network request into a plurality of sub-requests comprises identifying a set of linear topologies within the mesh topology for the virtual network request in which the number of virtual links in any two of the linear topologies in the set of linear topologies differs by no more than one.

4. The method of claim 1, wherein partitioning the virtual network request into a plurality of sub-requests comprises identifying a set of linear topologies within the mesh topology for the virtual network request in which there are no overlapping virtual links between the linear topologies in the set of linear topologies.

5. The method of claim 1, wherein:
   for at least one of the sub-requests, computing the respective chaining solution comprises computing two or more chaining solutions for the sub-request; and
   combining the respective chaining solutions for each of the sub-requests comprises:
      selecting one of the two or more chaining solutions computed for the at least one sub-request; and
      combining the selected chaining solution with respective chaining solutions for one or more sub-requests other than the at least one sub-request.

6. The method of claim 1, wherein for two or more of the sub-requests, the respective chaining solutions are computed in parallel.

7. The method of claim 1, further comprising:
configuring, by one or more resource orchestrators in the resource orchestration framework, resources of one or more of the plurality of physical nodes for implementation of the respective virtual nodes to which they are mapped by the mapping solution generated for the virtual network request.

8. The method of claim 1, wherein:
at least two of the plurality of physical nodes reside in different ones of a plurality of domains in a multi-domain network; and
the resource orchestrator is one of a plurality of resource orchestrators in the resource orchestration framework, each of which coordinates resource usage in a respective one of the plurality of domains.

9. The method of claim 1, wherein:
the virtual network request further specifies a resource requirement for at least one of the virtual links; and
for at least one of the sub-requests, computing the respective chaining solution comprises mapping a virtual node in the subset of virtual nodes for which a linear topology is specified for the sub-request to a physical node in response to determining that a physical link to the physical node meets the specified resource requirement for the at least one virtual link.

10. The method of claim 1, wherein, for at least one of the sub-requests, computing the respective chaining solution comprises:
identifying a first physical node at which a resource requirement for a first virtual node in the linear topology for the sub-request is met;
mapping the first physical node to the first virtual node in a candidate chaining solution for the sub-request;
determining that a resource requirement for a second virtual node in the linear topology for the sub-request is met on a second physical node, the second physical node being a neighbor of the first physical node; and
mapping the second physical node to the second virtual node in the candidate chaining solution.

11. The method of claim 1, wherein, for at least one of the sub-requests, computing the respective chaining solution comprises:
sending, by the resource orchestrator to another resource orchestrator in a network domain other than the network domain in which the resource orchestrator resides, a controller message comprising a partially mapped candidate chaining solution for the sub-request;
determining, by the other resource orchestrator, that a resource requirement for a given virtual node in the linear topology for the sub-request is met on a given physical node in the network domain other than the network domain in which the resource orchestrator resides; and
mapping the given physical node to the given virtual node in the candidate chaining solution.

12. A resource orchestration framework, comprising:
a plurality of vertices, each of which represents a respective one of a plurality of physical nodes in a network; and
a resource orchestrator;
wherein the resource orchestrator comprises:
a processor; and
a memory storing program instructions that when executed by the processor cause the processor to perform:
receiving a virtual network request specifying:
a set of virtual nodes;
a set of virtual links, each of which connects two of the virtual nodes in a mesh topology for the virtual network request; and
a resource requirement for at least one of the virtual nodes;
generating a mapping solution for the virtual network request in which each virtual node in the set of virtual nodes is mapped to a respective one of the plurality of physical nodes, wherein generating the mapping solution comprises:
partitioning the virtual network request into a plurality of sub-requests, wherein each sub-request specifies a linear topology for a subset of the virtual nodes and virtual links within the mesh topology for the virtual network request, and the plurality of sub-requests collectively include all virtual links within the mesh topology for the virtual network request;
initiating, for each sub-request, an independent computation of a respective chaining solution in which each virtual node in the subset of virtual nodes for which a linear topology is specified for the sub-request is mapped to a physical node on which resources sufficient for implementing the virtual node are available; and
combining the respective chaining solutions for each of the sub-requests.

13. The resource orchestration framework of claim 12, wherein partitioning the virtual network request into a plurality of sub-requests comprises identifying all linear topologies within the mesh topology for the virtual network request in which the number of links is less than or equal to a predetermined maximum number of links.

14. The resource orchestration framework of claim 12, wherein partitioning the virtual network request into a plurality of sub-requests comprises identifying a set of linear topologies within the mesh topology for the virtual network request in which the number of virtual links in any two of the linear topologies in the set of linear topologies differs by no more than one.

15. The resource orchestration framework of claim 12, wherein partitioning the virtual network request into a plurality of sub-requests comprises identifying a set of linear topologies within the mesh topology for the virtual network request in which there are no overlapping virtual links between the linear topologies in the set of linear topologies.

16. The resource orchestration framework of claim 12, wherein when executed by the processor, the program instructions further cause the processor to perform:
configuring resources of one or more of the plurality of physical nodes for implementation of the respective virtual nodes to which they are mapped by the mapping solution generated for the virtual network request.

17. The resource orchestration framework of claim 12, wherein:
at least two of the plurality of physical nodes reside in different ones of a plurality of domains in a multi-domain network; and
the resource orchestrator is one of a plurality of resource orchestrators in the resource orchestration framework, each of which coordinates resource usage in a respective one of the plurality of domains.

18. The resource orchestration framework of claim 12, wherein:
the virtual network request further specifies a resource requirement for at least one of the virtual links; and for at least one of the sub-requests, the independent computation of a respective chaining solution in which each virtual node in the subset of virtual nodes for which a linear topology is specified for the sub-request is dependent on the specified resource requirement for the at least one virtual link.

19. The resource orchestration framework of claim 12, wherein when executed by the processor, the program instructions further cause the processor to perform, for at least one of the sub-requests:
   identifying a first physical node at which a resource requirement for a first virtual node in the linear topology for the sub-request is met;
   mapping the first physical node to the first virtual node in a candidate chaining solution for the sub-request;
   determining that a resource requirement for a second virtual node in the linear topology for the sub-request is met on a second physical node, the second physical node being a neighbor of the first physical node; and
   mapping the second physical node to the second virtual node in the candidate chaining solution.

20. The resource orchestration framework of claim 12, wherein, for at least one of the sub-requests, initiating the independent computation of a respective chaining solution in which each virtual node in the subset of virtual nodes for which a linear topology is specified for the sub-request comprises:
   sending, to another resource orchestrator in a network domain other than the network domain in which the resource orchestrator resides, a controller message comprising a partially mapped candidate chaining solution for the sub-request.

* * * * *